United States Patent
Yoneda

[19]

[11] Patent Number: 5,946,418
[45] Date of Patent: Aug. 31, 1999

[54] CODING METHOD, SEMICONDUCTOR MEMORY FOR IMPLEMENTING CODING METHOD, DECODER FOR SEMICONDUCTOR MEMORY AND METHOD FOR IDENTIFICATION OF HAND-WRITTEN CHARACTERS

[75] Inventor: Masato Yoneda, Tokyo, Japan

[73] Assignee: Kawasaki Steel Corporation, Kobe, Japan

[21] Appl. No.: 08/927,461

[22] Filed: Sep. 11, 1997

Related U.S. Application Data

[63] Continuation of application No. 08/044,195, Apr. 8, 1993, Pat. No. 5,675,668.

[30] Foreign Application Priority Data

| Apr. 8, 1992 | [JP] | Japan | 4-87219 |
| Apr. 30, 1992 | [JP] | Japan | 4-111572 |
| Jun. 30, 1992 | [JP] | Japan | 4-172855 |
| Jul. 10, 1992 | [JP] | Japan | 4-183917 |
| Aug. 19, 1992 | [JP] | Japan | 4-220448 |
| Oct. 23, 1992 | [JP] | Japan | 4-286261 |
| Oct. 23, 1992 | [JP] | Japan | 4-286262 |
| Oct. 29, 1992 | [JP] | Japan | 4-291534 |

[51] Int. Cl.[6] ............................................. G06K 9/36
[52] U.S. Cl. ................................... 382/240; 382/226
[58] Field of Search ......................... 382/185, 187, 382/196–198, 202, 226, 240

[56] References Cited

U.S. PATENT DOCUMENTS

| 3,609,685 | 9/1971 | Deutsch | 382/198 |
| 4,561,105 | 12/1985 | Crane et al. | 382/185 |
| 4,853,696 | 8/1989 | Mukherjee | 341/65 |
| 4,989,258 | 1/1991 | Takahashi et al. | 382/226 |
| 5,010,579 | 4/1991 | Yoshida et al. | 382/226 |
| 5,014,334 | 5/1991 | Fukuhara et al. | 382/233 |
| 5,029,223 | 7/1991 | Fujisaki | 382/226 |
| 5,058,184 | 10/1991 | Fukushima | 382/158 |
| 5,067,165 | 11/1991 | Nishida | 382/195 |
| 5,123,057 | 6/1992 | Verly et al. | 382/156 |
| 5,151,950 | 9/1992 | Hullender | 382/187 |
| 5,228,098 | 7/1993 | Crinon et al. | 382/240 |
| 5,522,056 | 5/1996 | Watanabe et al. | 395/455 |

OTHER PUBLICATIONS

Tamori et al., "On–line Hand–Written Characters Identifying Method by Applying Fuzzy Reasoning," Electronic Information Communications D–II vol. J74–DII No. 2 pp. 166–174, Feb. 1991.

*Primary Examiner*—Christopher S. Kelley
*Attorney, Agent, or Firm*—Oliff & Berridge, PLC

[57] ABSTRACT

The present invention related to a coding method suited to obtain at a high speed a code number determined according to a sequence of arrangement of a plurality of texts which are arranged in a tree structure and output the code number and a semiconductor memory for implementing the coding method wherein a node number is assigned to each of nodes of the tree structure and a node to which the retrieval should advance is obtained in accordance with both a text entered and a node number of a node where the retrieval currently stays.

2 Claims, 27 Drawing Sheets

(hand-written character)

CODING METHOD, SEMICONDUCTOR MEMORY FOR IMPLEMENTING CODING METHOD, DECODER FOR SEMICONDUCTOR MEMORY AND METHOD FOR IDENTIFICATION OF HAND-WRITTEN CHARACTERS

This is a Continuation of application Ser. No. 08/044,195 filed Apr. 8, 1993, U.S. Pat. No. 5,675,668.

BACKGROUND OF THE INVENTION

1. Field of the Invention

The present invention relates to a coding method which is suited to obtain and output, at a high speed, a code number determined in accordance with an array order of a plurality of texts arrayed in a tree structure, a semiconductor memory for implementing the coding method, a decoder suited to the semiconductor memory and a method for identifying hand-written characters at a high speed by using the semiconductor memory.

2. Description of the Related Art

A method by which a plurality of retrieval data (texts) are ideally arrayed while permitting reappearance of the data and data (code numbers) to be retrieved which is predetermined in accordance with the order of array of the texts has conventionally been taken into consideration.

The following describes an art related to the present invention described later with an example of identification of hand-written characters.

Conventionally, it has often been attempted to identify hand-written characters. As an approach for identifying hand-written characters, a method has been proposed which utilizes the features particularly remarkable in Kanji characters as described below:

(1) A shape of a stroke is approximately predetermined.

(2) A pause between strokes can be clearly checked if, for example, a restrictive requirement "write in Kaisho (square style)" is prescribed.

Specifically, a number of sets of basic strokes of Kanji characters or the like, which are respectively patterned by modelling the strokes of Kanji characters or the like, are prepared and a stroke of a hand-written character which is entered is compared by pattern-matching with a basic stroke and represented by the most similar basic stroke, thereby a basic stroke chain consisting of the basic strokes which are arrayed in an order of writing, including information which indicates an entry order of the strokes of each hand-written character, is obtained. Then this basic stroke chain is converted to a character code, that is, the hand-written character is thus identified.

Methods which can be adopted to obtain the basic strokes from the strokes of a hand-written character include, for example, forward reasoning, backward reasoning, blackboard system, neural network system, fuzzy reasoning, etc.

For example, in "'On-line Hand-written Characters Identifying Method by Applying Fuzzy Reasoning' Hirobumi Tamori et al, a treatise magazine of the Society of Electronic Information Communications D-II Vol.J74-DII No.2 pp.166–174, February 1991" (hereinafter simply referred to as the "literature"), a method for identifying hand-written characters by using a fuzzy reasoning is introduced as shown by the title of the treatise.

In identification of hand-written characters by using the above described various methods, a point to be noted is how the basic stroke chains should be converted to the character codes. The following describes an example of conventional method for converting the basic stroke chains to the character codes, referring to a practical example.

TABLE 1

| Basic Stroke | Basic Stoke Code (2 bits) |
|---|---|
| T0 | 00 |
| T1 | 01 |
| T2 | 10 |
| T3 | 11 |

TABLE 2

| Basic Stoke Chain | Character Code (Code) | Character Code (10 bits) |
|---|---|---|
| T0 | C1 | 0 0 0 0 0 0 0 0 0 1 |
| T0→T0 | C3 | 0 0 0 0 0 0 0 0 1 0 |
| T0→T1 | C4 | 0 0 0 0 0 0 0 1 0 0 |
| T0→T3 | C5 | 0 0 0 0 0 0 1 0 0 0 |
| T1→T2 | C7 | 0 0 0 0 0 1 0 0 0 0 |
| T0→T0→T1 | C8 | 0 0 0 0 1 0 0 0 0 0 |
| T0→T0→T2 | C9 | 0 0 0 1 0 0 0 0 0 0 |
| T1→T0→T0 | C10 | 0 0 1 0 0 0 0 0 0 0 |
| T1→T2→T1 | C11 | 0 1 0 0 0 0 0 0 0 0 |
| T1→T2→T3 | C12 | 1 0 0 0 0 0 0 0 0 0 |

Table 1 is a comparison table of the basic strokes T0, T1, T2 and T3 and the basic stroke codes each of which consists of two bits and is identified to be identical with one of the basic strokes T0, T1, T2 and T3, and Table 2 is a comparison table of the basic stroke chains each of which consists of an array of basic strokes and the character codes assigned to these basic stroke chains.

FIG. 24 shows an example of the basic strokes which are arrayed in a tree structure.

In FIG. 24, two branches are extended from the top node (peak) and basic strokes T0 and T1 are respectively arranged at the nodes of the ends of these branches. Character code C1 is assigned to the node where the basic stroke T0 is arranged whereas no character node is assigned to the node where the basic stroke T1 is arranged. Further three branches are extended from the node where the basic stroke T0 is arranged and basic strokes T0, T1 and T3 are arranged at the nodes of the ends of these three branches. Character codes C3, C4 and C5 are assigned to these nodes. Of these nodes, further two branches are extended from the node where the basic stroke T0 is arranged and basic strokes T1 and T2 are arranged at the nodes of the ends of these two branches and character codes C8 and C9 are assigned to these nodes. Two branches are extended from the node in the top stage where the basic stroke T1 is arranged and basic strokes T0 and T2 are respectively arranged at the nodes of the ends of these two branches and the character code C7 is assigned to the node where the basic stroke T2 is arranged of the above two nodes. In addition, one and two branches are extended from the nodes where basic strokes T0 and T2 are arranged and the basic stroke T0 is arranged at the node of the end of the branch extended from the node where the basic stroke T0 is arranged and the character code 10 is assigned to this node while basic strokes T1 and T3 are arranged at the nodes of the ends of two branches extended from the node where the basic stroke T2 is arranged and character codes C11 and C12 are assigned to these nodes. In FIG. 24, node numbers (0) and (1) are assigned to the top node and the node where the basic stroke T0 is arranged and the character code C1 is assigned. These node numbers (0) and (1) are assigned for convenience in the description related to the present invention described later and, in this description, the concept of "node number" is not required.

The following describes a case for obtaining a character code C4 corresponding to basic stroke chain T0→T1 along which basic strokes T0 and T1 are arranged in this order.

When the first basic stroke T0 (basic stroke code '00') is entered, the addresses where basic strokes T0 and T1 which are arranged at the first two nodes (the highest stage in FIG. 24) of the tree-structured data are entered into the storage, basic stroke codes '00' and '01' are outputted in sequence and the outputted basic stroke codes '00' and '01' are compared in sequence with the entered basic stroke code '00'. In this case, it is assumed that the basic stroke T0 (basic stroke code '00') is stored in the first address of the storage and an address on the storage where the basic stroke T0 which corresponds to the entered basic stroke T0 is specified by one access operation to the address and one comparison operation. This means that the retrieval advances to the node where the basic stroke T0 is arranged while following the left side branch of two branches in the top stage in FIG. 24.

When the basic stroke T1 (basic stroke data '01') is entered, the contents of the address specified as above on the storage is referred, the addresses of basic strokes T0, T1 and T3 arranged at the nodes of the ends of branches extended from the node with the basic stroke T0 are entered in sequence into the storage to obtain basic strokes T0, T1 and T3 and these basic strokes T0, T1 and T3 thus obtained in sequence are compared with the basic stroke T1 entered. If it is assumed that basic strokes T0, T1 and T3 are stored in sequence, the stored basic stroke T1 is positioned at the second place and therefore an address on the storage where the basic stroke T1, which corresponds to the entered basic stroke T1, is stored is specified by two address accesses and two pattern matching comparisons. This means that the retrieval advances to the node which forms the second stage from the top in FIG. 24 with the basic stroke T1 arranged whereby the character code C4 assigned to this node is obtained and outputted.

Here the basic stroke chain T0→T1 is described. In this case, the character code 4 is obtained by three address accesses and three pattern matching comparisons.

The conventional example shows a simplified example. If the stages of the tree structure shown in FIG. 24 respectively have extremely large numbers of nodes, there is a problem that a desired character code can only be obtained by an extremely large number of times of address accesses and pattern matching comparisons and it takes a long period of time to obtain the desired character code.

In the above description of the method for identification of hand-written characters as an example, words 'basic stroke', 'basic stroke chain' and 'character code' are used to facilitate understanding. However, the present invention described later is capable of covering a wide range of application in addition to the identification of hand-written characters and therefore, in the following description, generalized words 'text', 'text chain, and 'code number' are used instead of "basic stroke', "basic stroke chain' and 'character code'.

An object of the present invention described later is to provide a coding method and a semiconductor memory for realizing this coding method which are capable of solving the above described problems and obtaining a desired code number within an extremely short period of time even if a number of nodes are arrayed in each stage of a tree structure for data. The following further describes other related arts before the detailed description of the present invention.

FIG. 25 is an approximate configuration showing an example of a conventional semiconductor memory.

This semiconductor memory is provided with a memory section 1 which comprises a number of memory areas each of which consists of a plurality of memory cells as many as the predetermined number of bits (m bits) (i.e. one word) and a word line 4 is extended from a row decoder 2 to each of memory areas. In this case, the memory section 1 is divided into a plurality of blocks 1-1, 1-2, ..., 1-n.

Each of blocks 1-1, 1-2, ..., 1-n comprises a number of memory areas, bit lines 6-1-1, 6-2-1, ..., 6-n-1 extended to the uppermost memory cells which form the memory areas of blocks 1-1, 1-2, ..., 1-n are connected to a sense amplifier 10-1 through transistors 8-1-1, 8-2-1, ..., 8-n-1, bit lines 6-1-2, 6-2-2, ..., 6-n-2 extended to the second memory cells from the top which form the memory areas are connected to a sense amplifier 10-2 through transistors 8-1-2, 8-2-2, ..., 8-n-2, subsequent bit lines are similarly connected and bit lines 6-1-m, 6-2-m, ..., 6-n-m extended to the lowermost memory cells which form the memory areas are connected to a sense amplifier 10-m through transistors 8-1-m, 8-2-m, ..., 8-n-m. Gates of transistors 8-1-1, 8-1-2, ..., 8-1-m; 8-2-1, 8-2-2, ..., 8-2-m; ...; and 8-n-1, 8-n-2, ..., 8-n-m are connected with a column selection circuit 24 through control lines 12-1, 12-2, ..., 12-n which are respectively provided for blocks 1-1, 1-2, ..., 1-n.

When address data AD is entered into the semiconductor memory which is constructed as described above, the lower bit part of address data AD entered is entered into the row coder 2 and the higher bit part is entered into the column selection circuit 14. In the row decoder 2, a memory area is selected according to the data of the lower bit part of address data AD, and a logic '1' decode signal which indicates that the memory area is selected is outputted to a word line extending to the memory area while, simultaneously, in the column selection circuit 24, a logic '1' control signal is outputted to a control line 12-2 corresponding to a block which includes the memory area selected in accordance with the data of the higher bit part of address data AD (in this case, as an example, the selected memory area is assumed to belong to block 1-2). The bit information stored in the memory cells which form the selected memory area is amplified in sense amplifiers 10-1, 10-2, ..., 10-m through bit lines 6-2-1, 6-2-2, ..., 6-2-m extending to the block 1-2 which are connected with sense amplifiers 10-1, 10-2, ..., 10-m and the contents stored in the selected memory area are read out to output terminals 16-1, 16-2, ..., 16-m.

If the semiconductor memory is configured as described above, sense amplifiers 10-1, 10-2, ..., 10-m need not be provided as many as the number of bit lines (m×n lines in the example shown in FIG. 25) and rn sets of sense amplifiers are satisfactory in case of the example shown in FIG. 25. In this case, since the sense amplifiers 10-1, 10-2, ..., 10-m respectively have a larger chip area than the memory cells for the reason of their configuration, a clearance between the memory cells is limited by the size of the sense amplifier and a number of memory cells cannot be arranged in high density when the sense amplifiers are provided, for example, respectively for bit lines 6-1-1, 6-1-2, ..., 6-1-m; 6-2-1, 6-2-2, ..., 6-2-m; ...; 6-n-1, 6-n-2, ..., 6-n-m whereas, in case of a configuration with a reduced number of sense amplifiers, the clearance between bit lines can be reduced without limitation due to the size of the sense amplifiers and therefore a high density semiconductor memory can be realized.

The following continues the description of the related arts.

Conventionally, those decoders, which are constructed to enter the bits of an address denoted by, for example, a 16-bit pattern into 16 input lines, respectively, and output a decode signal to one of approximate 65 K output lines (word lines) which are discriminated by this 16-bit pattern, have widely been used, for example, in the address decoders of memories.

FIG. 26 is a circuit diagram showing an example of the conventional decoder constructed as described above. In this case, however, a circuit with four input lines is shown for simplification.

Further for simplification, the same symbols are assigned to the input lines and the bit signals entered from these input lines.

In this description, the AND gates having as many input terminals as the number of input lines (four lines) are provided as many as the number of output lines, bit signals $a_0$, $a_1$, $a_2$ and $a_3$ entered from four input lines $a_0$, $a_1$, $a_2$ and $a_3$ are directly entered into the AND gates, or one or a plurality of these signals are inverted and entered into the AND gates whereby the decode signals are thus outputted from the AND gates. In this case, the inverted signals of the signals $a_0$, $a_1$, $a_2$ and $a_3$ are denoted as $a_0^*$, $a_1^*$, $a_2^*$ and $a_3^*$.

In the example shown in FIG. 26, a decode signal "1" is outputted from, for example, the top stage AND gate in FIG. 26 when all of input signals $a_0$, $a_1$, $a_2$ and $a_3$ have a logic level "1" and a decode signal "1" is outputted from the second stage AND gate when input signal $a_0$ has a logic level "0" and input signals $a_1$, $a_2$ and $a_3$ have a logic level "1".

If a decoder is constructed as shown in FIG. 26, the AND gate circuits provided with many input terminals are required accordingly as the number of input lines increases. An increased number of terminals will hinder signal transmission to be carried out at higher speeds and, for further speeding up of signal transmission, large-sized transistors will be required contrary to the demands for high density installation.

To solve this problem, a predecoding type decoder has been proposed.

FIG. 27 is a circuit diagram showing an example of a predecoding type decoder.

This pre(decoding type decoder has four input lines $a_0$, $a_1$, $a_2$ and $a_3$ which are divided into two input lines $a_0$ and $a_1$ and other two input lines $a_2$ and $a_3$ for which predecoders 17 and 18 are respectively provided and is constructed to finally obtain the same decode signal as in case of the decoder shown in FIG. 26 from the main decoder of the following stage. When the predecoding system is adopted, the decoder can be configured with, for example, AND gates with less input terminals as shown in FIG. 27 and therefore a compact high speed decoder can be realized.

SUMMARY OF THE INVENTION

An object of the present invention is to provide a coding method for obtaining a code number in an extremely short period of time even in a case that a number of nodes are arrayed in all stages of a tree structure as described in the foregoing and a semiconductor memory for implementing this method.

A coding method in accordance with the present invention for implementing the above described object is characterized in that a plurality of texts are arranged at respective nodes of a tree structure while permitting reappearance of the texts, a code number is assigned to each node as required and a text chain consisting of the above described texts which are arrayed in sequence along a route of branches to be followed is converted to a code number by obtaining a code number assigned to a node at an extreme end of followed-up branches of the tree structure, wherein a code number is assigned to each node of the tree structure, and a node toward which a retrieval should advance is determined in accordance with an entered text and a node number of a node where the current position of retrieval is identified when the text is entered.

In the above described coding method of the present invention, node numbers which differ, as a rule, one from another are preferably assigned to the nodes of the tree structure and a same node number can be assigned to a plurality of nodes if a plurality of nodes from which branches extend to the same node at the extreme end exist.

A coding method in accordance with the present invention is adapted so that node numbers are assigned to respective nodes of the tree structure and a next node to which the retrieval should advance is determined according to an entered text and a node number where the retrieval currently stays and therefore, even though a plural number of branches are extended from the node for the current position of the retrieval, the next node is immediately obtained by only one retrieval, differing from the above described conventional example which requires sequential search of such plural number of branches and the text chain is converted to a code number within an extremely short period of time.

In case of the present invention, if the same texts or text chains to which the same code number is assigned are positioned at the ends of a plurality of nodes at the ends of ramified branches, these same texts or text chains, though given the same number, can be processed as the nodes or node chains which differ one from another as far as they are positioned at ramified branches. However, the tree structure is formed so that the branches are extended from a plurality of these nodes to the same node and the same node number is assigned to a plurality of the above described nodes from which the branches are extended to the same node, the tree structure can be simplified as a whole and the circuit configuration as a hardware embodiment of the tree structure can be down-sized.

A semiconductor memory in accordance with the present invention for implementing the above described coding method is a semiconductor memory in which a plurality of texts are arranged at respective nodes of the tree structure while permitting reappearance of the texts, code numbers are assigned to the nodes as required, a text chain consisting of the texts arranged in sequence along a route of branches which are followed is converted to a code number by obtaining a code number assigned to a node located at an end of followed branches of the tree structure and the code numbers corresponding to the text chains are stored, and which is characterized in that the semiconductor memory comprises a decoder section which is provided with a first input part for entering a first bit pattern which denotes the text, a second input part which has a register for storing a second bit pattern which denotes a node number assigned to each of the above described nodes and enters the second bit pattern stored in this register and a correspondence detection part for detecting a node corresponding to the node which is determined by these first and second bit patterns entered, and a memory section which is provided with a node number output part, which has a number of memory areas which store a first bit pattern denoting a node number assigned to each of respective nodes and a third bit pattern denoting a node number if the node number is assigned to each of the nodes and are provided with corresponding to respective nodes and outputs the first bit pattern corresponding to the node number assigned to the node which is detected by the correspondence detection part and enters this first bit pattern into the register and a code number output part for outputting the third bit pattern which denotes the code number if the node number is assigned to the node detected by the correspondence detection part.

The semiconductor memory in accordance with the present invention is adapted so that, when the second bit pattern corresponding to the node number of the current node is stored in the register of the second input part and the first bit pattern is entered from the first input part in the decoder section, a node to which the retrieval should advance is detected according to this first bit pattern entered and the second bit pattern stored in the register and subsequently the second bit pattern, which denotes the node number of the node detected for the following retrieving operation, is outputted and stored in the register and the third bit pattern which denotes the code number is outputted if the code number is assigned to the detected node in the memory section, and therefore a code number corresponding to a text chain which consists of texts to be entered in sequence can be obtained within an extremely short period of time.

For actually implementing the semiconductor memory according to the present invention as an integrated circuit, it is preferable to design a circuit pattern to be commonly applicable to various types of tree structure data and modify only the wiring of the correspondence detection part for specific tree structure data. The wiring of this correspondence detection part functions to determine a node to which the retrieval should advance, that is, which address of the memory section should be designated when the first bit pattern denoting the text and the second bit pattern denoting the node number are entered into the correspondence detection part.

In this case, the circuit pattern of the correspondence detection part is made to meet various types of tree structure data and accordingly the circuit may remain partly unused in case of special tree structure data. Therefore the point to be noted is that this partial circuit should be treated at least to be free from affecting the operation of the whole semiconductor memory.

To solve this problem, the correspondence detection part of the semiconductor memory in accordance with the present invention is preferably constructed to be provided with a number of correspondence circuits each of which has a buffer and a plurality of transistors connected in series between the input side of the buffer and the ground and a precharge circuit for charging the input sides of respective buffers of the number of correspondence detection circuits before retrieval of a next node and to allow the gates of the transistors of other correspondence detection circuits except for some of the above described many correspondence detection circuits to be connected with the first input part and the second input part so that the input side of the buffer of a certain correspondence detection circuit which is determined in conformity to combination of the first bit pattern and the second bit pattern is discharged and the gate of at least one transistor to be maintained at a specified level so that at least one transistor of each correspondence detection circuit, which is included in the above described some correspondence detection circuits, is disconnected.

In this case, the buffer is a word to be captured as a concept including an inverter by which the output logic is inverted.

As described above, in the semiconductor memory in accordance with the present invention, if the correspondence detection part is configured to have a number of comparison/detection circuits and the above described precharge circuit and the above specified connection, an output of the buffer (including the inverter) is determined stably and primarily and therefore partial circuits which remain unused for the type of the tree structure do not function as an unstable factor against the operation as a whole when the output is used as a signal which indicates that the node is not designated and the whole semiconductor memory can be stably operated.

The semiconductor memory according to the present invention carries another problem which arises when any node to which the retrieval should advance is not detected in the correspondence detection part.

The following describes this problem, referring to Tables 1 and 2 and FIG. 25.

The retrieval is taken into account as a progress at a timing when the retrieval starts from the node number (0), for example, shown in FIG. 25 and advances to the node number (1). In this case, the node number (1) (data '0001') is stored in the register provided in the second input part. Under this condition, it is expected that one of the first bit pattern '00' corresponding to the text (basic stroke) T0, the first bit pattern '01' corresponding to the text (basic stroke) T1 and the first bit pattern '11' corresponding to the text (basic stroke) T3 is entered into the first input part (refer to FIG. 25). It is assumed that the first bit pattern '10' corresponding to the text (basic stroke) T2 has been entered by, for example, inadvertently pressing a wrong key of a keyboard of an apparatus in which the semiconductor memory in accordance with the present invention is incorporated. In this case, as shown in FIG. 25, the text (basic stroke) T2 does not exist at the end of the branch extended from the node number (1) and therefore any node is not detected by the correspondence detection part. In this case, there is a problem that a wrong second bit pattern such as, for example, '000' is outputted from the node number output part which forms the memory section, this wrong second bit pattern is stored in the register, the retrieval returns back to the first node with the node number (0) despite of the progress of retrieval up to a halfway node and therefore the retrieval need be restarted from the beginning.

If a predecoding type decoder which is divided into a predecoder and a main decoder is employed in the decoder section of the semiconductor memory according to the present invention, a compact high speed decoder section is realized as described above. However, in case of a conventional predecoding type decoder shown in FIG. 27, the number of input lines are predetermined and therefore the circuit configuration for 8-bit input signals differs from that for 16-bit signals. Accordingly, the circuit configuration of the semiconductor as a whole is different between address signals denoted with 8 bits and those denoted with 16 bits when this decoder is used as the address decoder of the semiconductor memory and various types of memories are therefore required in accordance with the number of bits for address signals. It is preferable that a memory of the same configuration can be used even if the numbers of bits of address signals are different.

In other words, if the above described conventional predecoding type decoder is incorporated in the semiconductor memory of the present invention, the number of bits of the bit pattern for retrieval to be used in the semiconductor memory of the present invention is fixedly determined and it is therefore preferable to generalize the semiconductor memory of the present invention to meet the first and second bit patterns consisting of various numbers of bits. For such generalization, it is preferable to install a decoder as described below in the semiconductor memory of the present invention. In other words, the decoder section of the semiconductor memory of the present invention which is configured for the above described object preferably incorporates a decoder as described below in order to solve a problem as described above and to continue the retrieval, which has advanced to a certain position, without restarting the retrieval from the beginning even when no node is detected by the correspondence detection part of the decoder section.

Specifically, the decoder of the semiconductor according to the present invention for selecting a memory area corresponding to an entered bit pattern from a number of memory areas which form the semiconductor memory in accordance with the entered bit pattern is provided with a first input part for entering a first bit pattern from an external source, a second input part which has a register for storing a second bit pattern which partly forms the contents read out from the semiconductor memory and entering the second bit pattern stored in the register, a correspondence detection part for selecting a memory area in which the contents to be read out from a number of memory areas in which a number of specified contents are stored by decoding the bit patterns entered both from the first input part and from the second input part, and a hit detection part for detecting a memory area selected by the correspondence detection part from a number of specified memory areas, and characterized in that the register preserves the contents stored when any of a number of specified memory areas is not selected by the correspondence detection part.

The decoder of the semiconductor memory according to the present invention is provided with the hit detection part and given a provision for storing the contents of the register provided in the second input part when any of a number of specified memory areas is not selected and therefore the retrieval is continued when next correct data is entered even though incorrect data is entered.

The decoder of the semiconductor memory for selecting a memory area corresponding to an entered bit pattern from a number of memory areas which form the semiconductor memory in accordance with bit pattern inputs is provided with a plurality of decoders for predecoding the bit patterns entered from a plurality of input lines for a plurality of groups of input lines obtained by dividing a plurality of input lines and a main decoder which receives the outputs of a plurality of these predecoders and decodes the bit patterns entered from a plurality of input lines jointly for the above described plurality of groups of input lines, and characterized in that the predecoders are respectively provided with a DON'T CARE circuit which masks, as required, each bit of the bit patterns entered from the input lines.

The decoder of the semiconductor memory according to the present invention which is provided with the predecoders and the main decoder can be realized as a compact high speed decoder as described above. The decoder of the present invention provided with the DON'T CARE circuit for masking, as required, each bit of the bit patterns entered is capable of being provided with, for example, a circuit adapted to the configuration of 16 input lines (for 16-bit signals) and decoding even 8-bit bit patterns by using the DON'T CARE circuit, thus allowing common application to various types of bit patterns even though the number of bits varies with the type of bit pattern.

The semiconductor memory of the present invention is preferably divided into a plurality of blocks as the conventional semiconductor memory shown in FIG. 26 from the viewpoint of reduction of power consumption. In this case, however, a problem as described below may be expected.

In case of the conventional semiconductor memory shown in FIG. 26, the word lines from which logic '1' decode signals are outputted and the control lines from which logic '1' control signals are outputted are primarily determined in accordance with address data AD entered from an external source and therefore a required memory area can be selected by the row decoder 12 using part of address data AD and a required block can be selected by the column selection circuit 24 using other part of address data AD.

In case of the semiconductor memory according to the present invention, a node to which the retrieval should advance is detected in accordance with a text (first bit pattern) entered from an external source and a node number (second bit pattern) which is read out from the memory section and stored in the register of the second input part (a memory area corresponding to the node is selected) and the correspondence of the first and second bit patterns to be entered and the memory area to be selected differs with the configuration of the tree structure data to be incorporated in the semiconductor memory. For this reason, the column selection circuit 24 cannot be fabricated by combining in advance the data to be entered and the block to be selected and therefore which bit line extending to the block should be connected to the sense amplifier cannot be known from the data entered and the semiconductor memory cannot be constructed as the conventional example shown in FIG. 26.

Though it is attempted to provide as many sense amplifiers as the number of memory cells which form one memory area for each of a plurality of divided blocks to solve the above problem, the clearance between bit lines cannot be reduced due to limitation by the size of the sense amplifier and high density mounting of sense amplifiers will be hindered as described in the foregoing.

The semiconductor memory of the present invention is preferably constructed to be capable of reducing the number of sense amplifiers and filling the requirements for high density installation, thus solving the above problem even if the correspondence between the data (referred to as "retrieval data") entered from the external source and the memory area to be selected cannot be primarily determined in advance.

The semiconductor memory of the present invention constructed as described above is characterized in that it is provided with a number of memory areas which are divided into a plurality of blocks and each of which comprises as many memory cells as the predetermined number of bits, a retrieval data input terminal through which retrieval data is entered, a correspondence detection part for storing a number of comparison data respectively corresponding to a number of memory areas, comparing the retrieval data entered through the retrieval data input terminal and a number of comparison data, and outputting a correspondence signal for selecting the memory area corresponding to the comparison data which matches with the retrieval data of a number of comparison data, a plurality sense amplifiers which are provided as many as the number of memory cells for the predetermined number of bits and amplify to read out the contents stored in the memory cells, and a block selection circuit which selects a block including the memory area selected with the decode signal from a plurality of blocks according to the correspondence signal outputted from the correspondence detection part and connecting the memory cells in the selected block to the sense amplifier.

The semiconductor memory of the present invention which is divided into a plurality of blocks is adapted so that a block which includes the memory area is selected according to the decode signal outputted from the decoder from a plurality of these blocks in which a number of memory areas are divided and connected to the sense amplifier and, therefore, as in case of the semiconductor memory shown in FIG. 26 which is constructed to select a desired block according to address data AD, the number of sense amplifiers can be reduced as compared with the number of bit lines and the bit lines can be arranged in high density without affecting by the size of sense amplifiers, thereby a high density semiconductor memory can be materialized.

The semiconductor memory of the present invention is adapted for a coding method in accordance with the present invention, more specifically, processing of tree structure data that the "array" of retrieval data corresponds to one retrieved data. In some data structures to be used in the retrieval, for example, for conversion from JIS codes to ASCII codes, retrieval data corresponds to retrieved data one to one (hereinafter referred to as "simple conversion table data"). For processing the simple conversion table data of the structure in which retrieval data corresponds to retrieved data one to one, such processing can be implemented by storing retrieved data in, for example, a commonly used semiconductor memory and using the address data to be entered into this semiconductor memory as retrieval data. However, general semiconductor memories are unsuitable for processing the tree structure data. The semiconductor memory which processes the tree structure data that the "array" of retrieval data corresponds to the retrieved data is realized with the above described semiconductor memory in accordance with the present invention. The semiconductor memory of the present invention can be used for processing the simple conversion table data in addition to the tree structure data. However, the register provided in the decoder section always stores, for example, '0000' and those areas of the correspondence detection part corresponding to the node numbers and those areas of the memory section corresponding to the node numbers remain unused to result in enormous waste.

The semiconductor memory according to the present invention can have a construction for processing only the tree structure data but it preferably has a general-purpose construction capable of processing one to one structure data in addition to the tee structure data without causing a lot of waste.

The semiconductor memory of the present invention which is constructed as described above is characterized to be provided with a memory section provided with a number of memory areas each of which consists of a first and second output data storage areas where specified first and second output data which form specified output data is stored, a first input part for entering first retrieval data from an external source, a second input part provided with a register for storing second retrieval data and an input selector for selectively entering the retrieval data entered from the external source and the first output data read out from the memory section into the register as the second retrieval data, a correspondence detection part provided with a plurality of comparison data storage areas each of which consists of first and second comparison data storage areas which respectively store specified first and second comparison data and compare the first and second comparison data with the first and second retrieval data entered from the first and second input parts and which respectively correspond to a number of memory areas and a number of correspondence detection circuits and a plurality of correspondence detection circuits which are arranged respectively corresponding to the comparison data storage areas and the memory areas and output decode signals which command reading out of the output data stored in the corresponding memory areas when the fist and second comparison data stored in the first and second comparison data storage areas which form the corresponding comparison data storage areas respectively correspond to the first and second retrieval data, a first masking circuit for treating a number of the first comparison data storage areas while assuming that the first comparison data corresponds to the first retrieval data regardless of the state of the first comparison data stored in the first comparison data storage area, and a second masking circuit for treating a number of the second comparison data storage areas while assuming that the second comparison data corresponds to the second retrieval data regardless of the state of the second comparison data stored in the second comparison data storage area.

The semiconductor memory having the above described construction is provided with the first and second input parts and constructed to have a number of memory areas forming the memory section which are divided into the first output data storage area and the second output data storage area so that the first output data read out from the first output data storage area may be entered again from the second input part and therefore this semiconductor memory is capable of retrieving the tree structure data as the semiconductor memory which has been described.

In addition, the semiconductor memory with the above described construction is provided with the first masking circuit which masks the first retrieval data entered from the first input part and the second masking circuit which masks the second retrieval data entered from the second input part, and the second input part is provided with an input selector which permits entry of the retrieval data from an external source into the second input part. For example, the simple conversion table data is stored in a first pair of the first comparison data storage areas and the first output data storage areas and a second pair of the second comparison data storage areas and the second output data storage areas, and then the first pair can be retrieved while the second input part is masked and the second pair can be retrieved while the first input part is masked. Therefore such wasteful use is prevented as in the case that the semiconductor memory according to the present invention which has been described and is advantageous in processing the tree structure data is forcibly applied to processing of simple conversion table data and a semiconductor memory suited to processing of either the tree structure data or the simple conversion table data can be constructed. This semiconductor memory can store the tree structure data in its part and the simple conversion table data in its other part without waste.

A method for identification of hand-written characters using the semiconductor memory according to the present invention is implemented with an inference mechanism for classifying the strokes of a hand-written character into one or a plurality of basic strokes and a semiconductor memory in which a plurality of the basic strokes are arranged at the nodes of a tree structure while permitting reappearance of these basic strokes, character codes are arranged at these nodes as required and the character codes corresponding to the basic stroke chain for converting the basic stroke chain which consists of the basic strokes arranged in sequence along a branch following route by obtaining a character code assigned to a node which is positioned at an end of a branch train of the tree structure, and which has a decoder section provided with a first input part for entering a first bit pattern which denotes the basic stroke, a second input part which has a register for storing a second bit pattern which denotes the node number assigned to each of respective nodes and enters the second bit pattern stored in this register and a correspondence detection part which detects a node which corresponds to the node determined by these first and second bit pattern inputs in accordance with the first and second bit pattern inputs, and a memory section which has a number of memory areas which store a first bit pattern denoting a node number assigned to each of respective nodes and a third bit pattern denoting the character code when a character code is assigned to each node and is provided with a number of memory areas corresponding to the nodes and is provided with a node number output part which outputs the first bit pattern corresponding to the node number assigned to the node detected by the correspondence detection part and enters it into the register and a character code output part which outputs the third bit pattern denoting the character code when the character code is assigned to the node detected by the correspondence detection part and characterized in that a stroke chain of a hand-written character is converted to one or a plurality of basic strokes by using the reasoning mechanism and a basic stroke chain is converted to a character code by using the semiconductor memory.

Various kinds of reasoning mechanisms such as forward reasoning, backward reasoning and fuzzy reasoning can be adopted as the above described reasoning mechanism, and this reasoning mechanism includes simple pattern matching, various neural networks for identifying patterns, etc. having an equivalent function even though they are not specified as "reasoning". This reasoning mechanism can be adapted to make the entered strokes definitely correspond to the basic strokes and consequently obtain a sole basic stroke chain corresponding to the entered stroke chain and otherwise, for example, to make a plurality of basic strokes corresponding to the entered stroke chains according to a theory of probability based on, for example, the fuzzy reasoning or the neural network if, for example, a peculiarity of an entered stroke is serious and it is difficult to make the entered stroke definitely correspond to an appropriate basic stroke.

A method for identification of hand-written characters in accordance with the present invention employs the semiconductor memory of the above described configuration for obtaining a character code corresponding to a basic stroke chain after the basic stroke chain has been obtained and therefore a next due node is immediately determined by one retrieval operation even though a plurality of branches extend from the node where the retrieval currently stays, differing from the example of the conventional method in which the plurality of branches are searched in sequence, and the basic stroke chain can be converted to the character code within an extremely short period of time.

As described above, the present invention is intended to determine the next due node while referring to the entered text and the node number and therefore sequential comparison as in case of the conventional example is not required, the retrieval can advance to the next node by only one operation even in case of the tree structure in which a number of branches extend from one node and a desired code number can be obtained at an extremely high speed.

DESCRIPTION OF THE PREFERRED EMBODIMENTS

Preferred embodiments of the present invention are described below. In this case, Tables 1 and 2 referred in the description of the conventional example are directly used. The basic stroke, basic stroke code, basic stroke chain, character code (code) and character code (10 bits) shown in Tables 1 and 2 are respectively read as the text, text code, text chain, code number and chain code which are generally termed.

Figure 1:
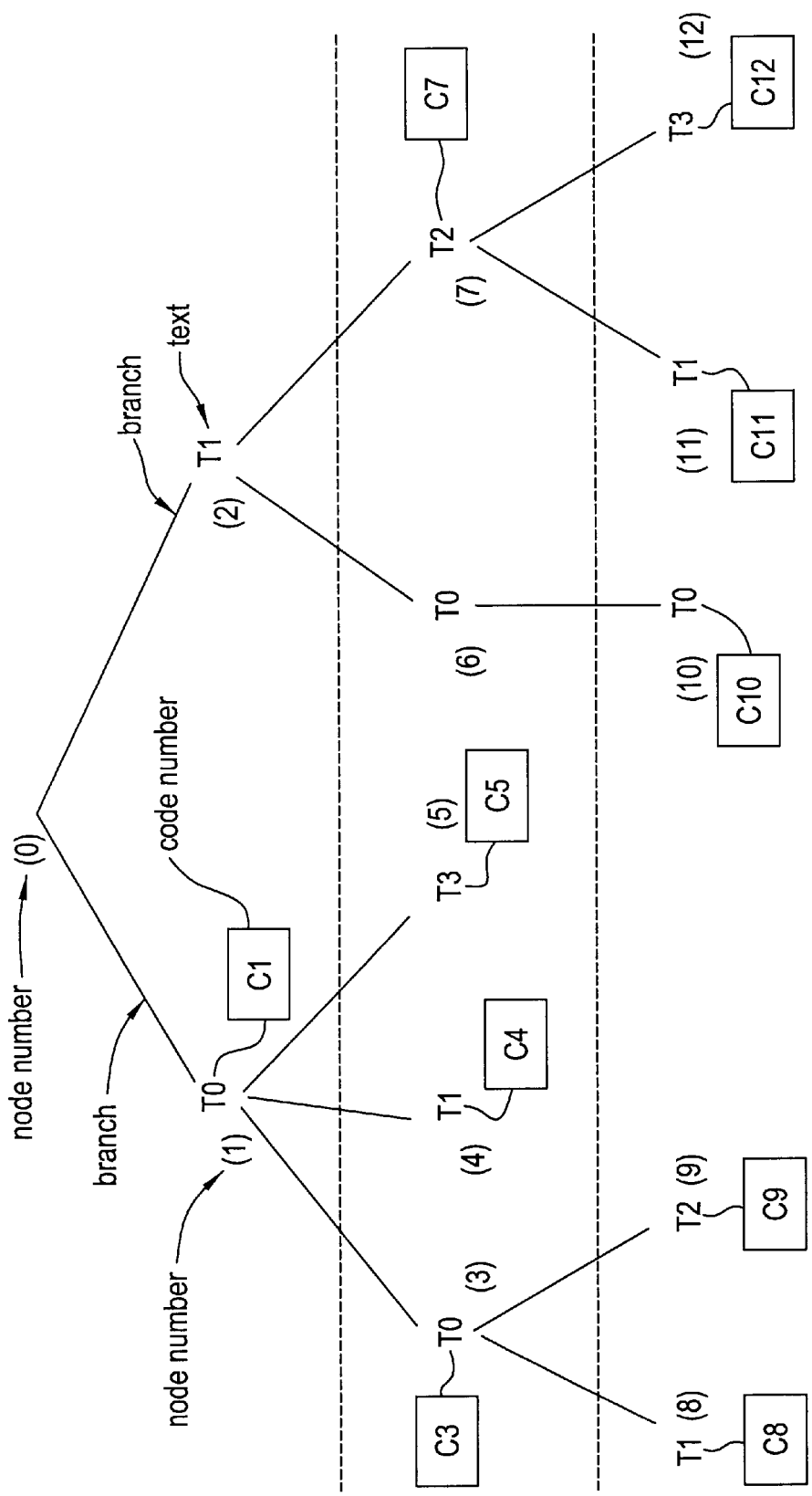
FIG. 1 is a diagram showing a data structure (tree structure) in accordance with an embodiment of the present invention.

FIG. 1 shows a data structure (tree structure) in accordance with an embodiment of the present invention.

Figure 24:
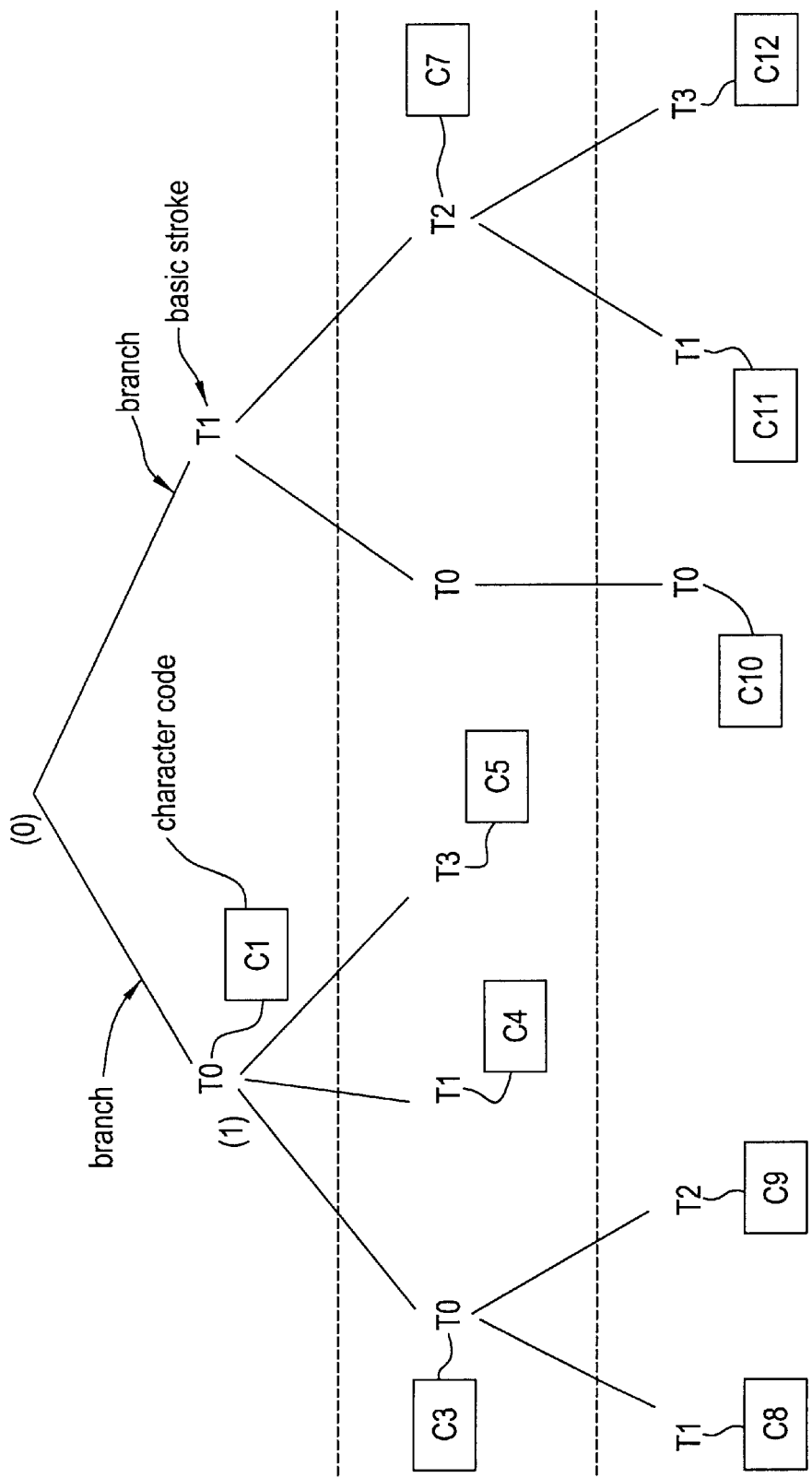
FIG. 24 is a diagram showing an example of basic strokes arranged in the tree structure.
Figure 25:
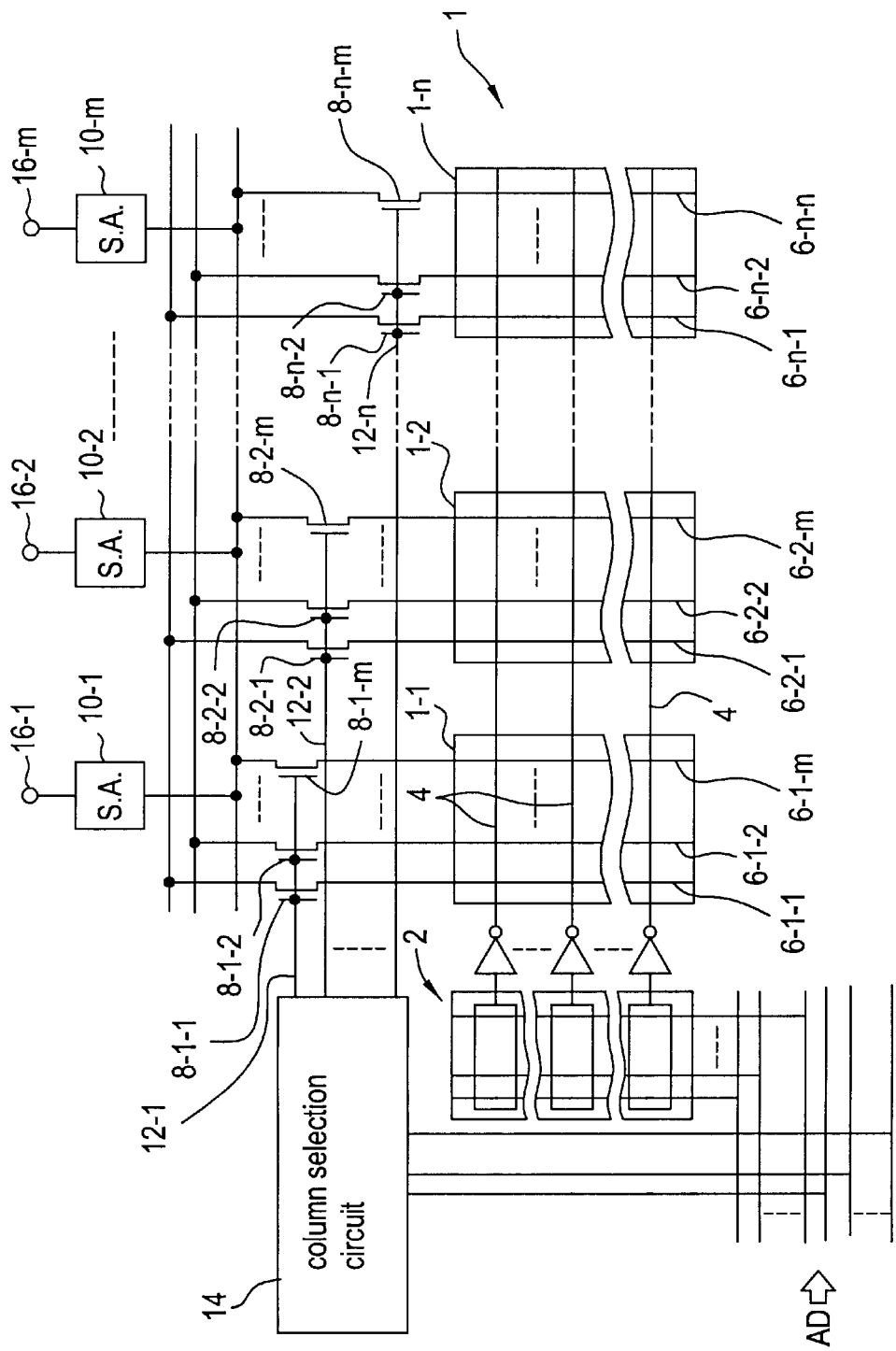
FIG. 25 is an approximate diagram showing an example of the conventional semiconductor memory.
Figure 26:
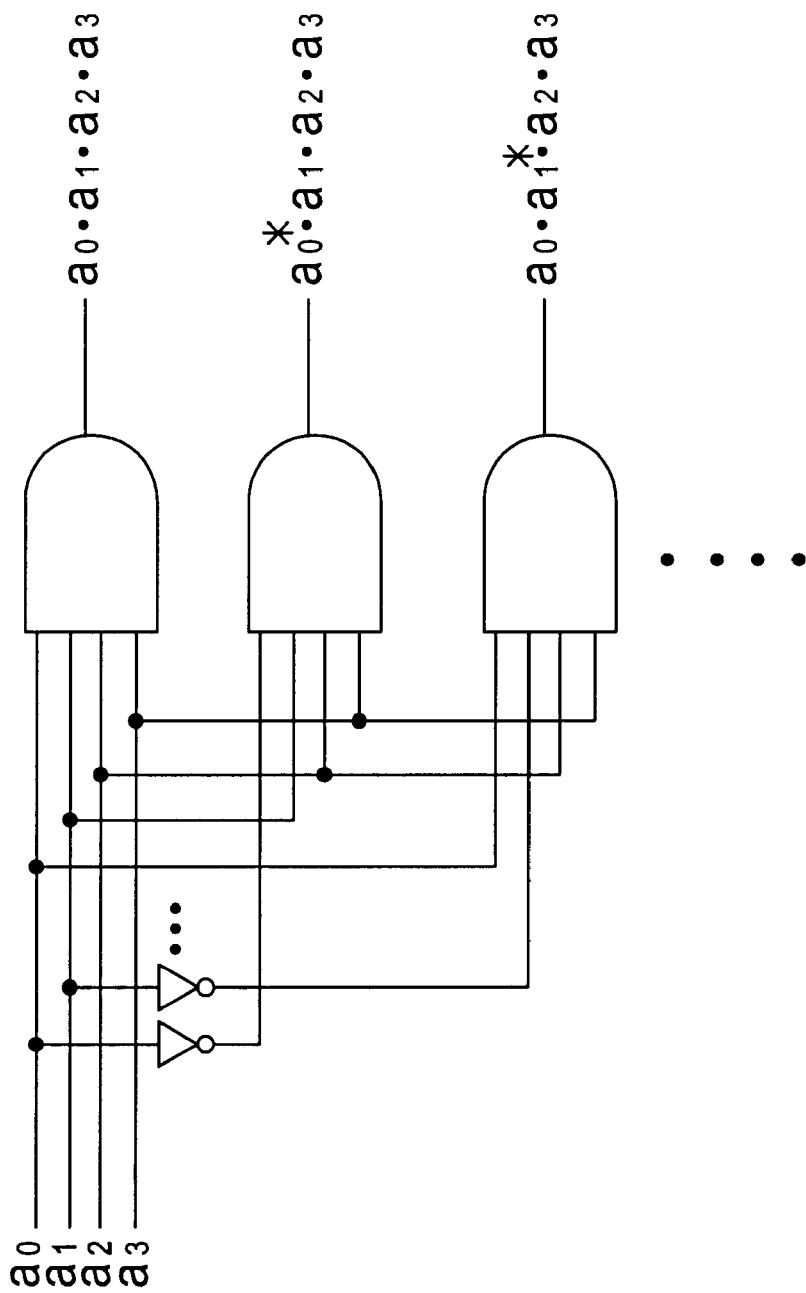
FIG. 26 is a circuit diagram illustrating an example of the decoder.

FIG. 1 corresponds to FIG. 24 referred in the description of the conventional example except a difference from FIG. 24 that the node numbers (given in brackets) are assigned to respective nodes. In FIG. 1, the basic stroke and the character code shown in FIG. 24 are rewritten as the text and the code number.

The coding method with the tree-structured data is described in detail below.

First, a condition of retrieval when a text chain T0→T1 is entered is assumed. In this case, an expected output chain code is '0000000100' as defined in Table 1.

To obtain this result, a text code '00' corresponding to the text T0 is entered. In the tree structure, the text T0 is arranged at a node at an end of a branch with the node number (0) (node number (0) is the first node number for coding). Though there is only one text T0 which is connected to an end of a branch extended from the node to which the node number (0) is assigned, there are other several nodes which are connected to the nodes other than the node to which the node number (0) is assigned and at which the text T0 is arranged.

In this case, to identify that a text to be entered into this tree structure data is the first text T0 of the tree structure data, both this text data '00' and the node number (0) (data '0000') are searched. The code number C1 (chain code '0000000001') is given to the node at the end of this branch where the text T0 is arranged but this is not a code number to be obtained in this case.

Subsequently, when the text data '01' corresponding to the text T1 is entered, the tree structure data base is retrieved with the node number (1) of the preceding text data (data '0001') and the text data '01' entered this time, thereby the text T1 at an end of the other branch and the text T1 at an end of a branch to the node of which the node number (1) is assigned can be definitely distinguished.

With this, the branches of the text chain T0→T1 are specified and the code number C4 (chain code '0000000100') assigned to the end of branch T1 is outputted as a code number to be obtained. Similarly, optional chain codes C1, ..., C12 defined in Table 1 can be obtained.

Figure 2:
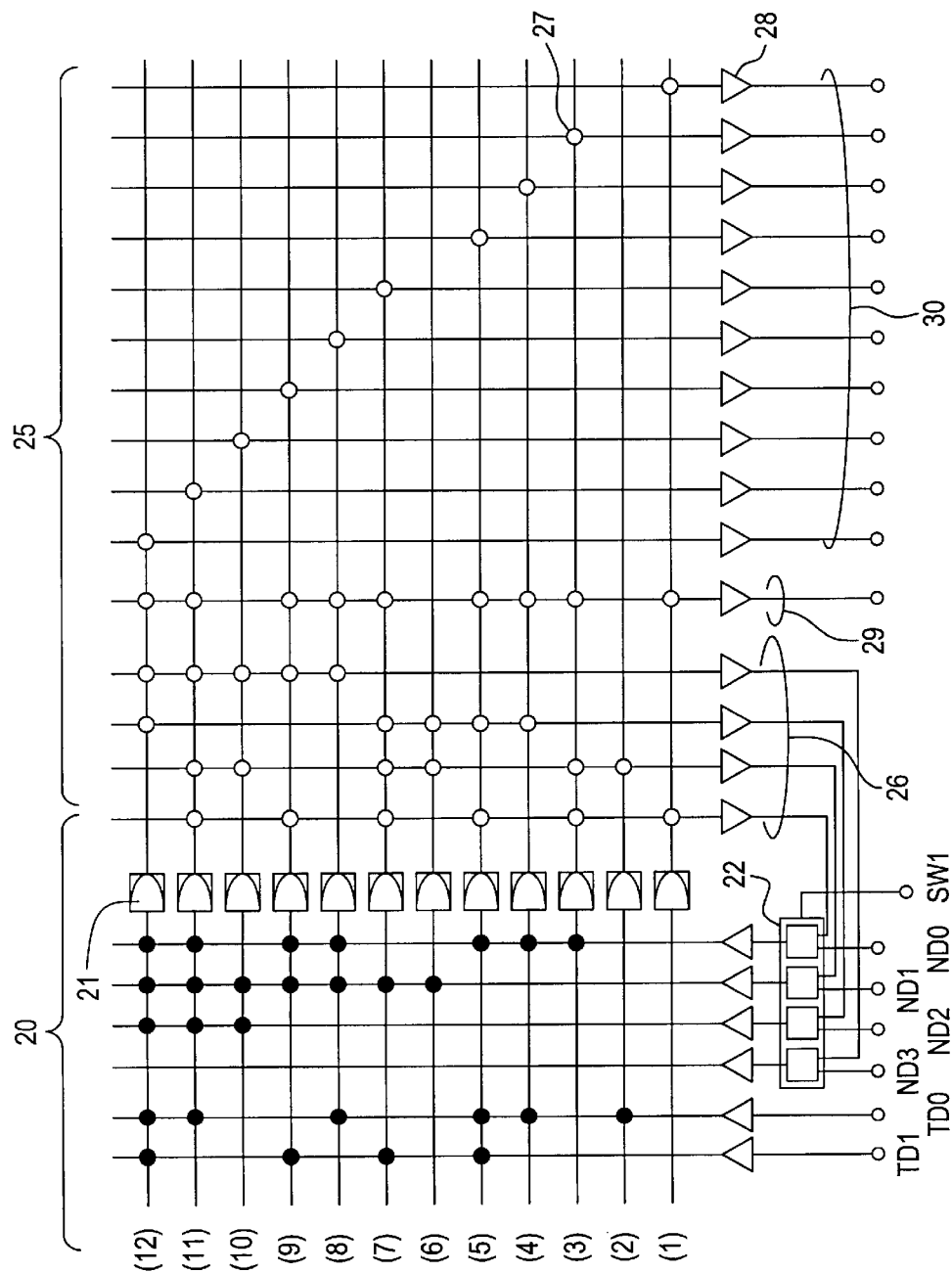
FIG. 2 is a diagram showing an example of a coding appearance which is a hardware embodiment of the data base in the tree structure.

FIG. 2 shows an example of the semiconductor memory which is a hardware embodiment of the data base of this tree structure.

The decoder section 20 of this semiconductor memory is provided with text data input terminals TD0 and TD1 which form the first input part specified by the present invention and node number input terminals ND0, ND1, ND2 and ND3 which form the second input part specified by the present invention. Those data entered from node number input terminals ND0, ND1, ND2 and ND3 are entered into the register 22. The node number data output 26 from the memory section 25 is connected to this register 22 and changed over by the output changeover terminal SW1.

Numbers given at the left end of the decoder section 20 denote node numbers (1), (2), (3), ... (12) of the nodes of the tree structure shown in FIG. 1. For example, the node number (1) on the lowest line denotes the node where the text T0 is arranged in the uppermost stage of the tree structure shown in FIG. 1.

In this decoder section 20, the lines which extend to the correspondence detection circuits in the horizontal direction and correspond to the respective nodes intersect with the data lines from text data input terminals TD0 and TD1 and the data lines from node number registers 22 which extend in the vertical direction. The decoder section is constructed so that the output of the correspondence detection circuit 21 is '1' (active) when the data on the data line with black dots at its intersections is forward data '1' and the data on the data line without black dots at its intersections is inversion data '0'. In other words, when all outputs from text data input terminals TD0 and TD1 and the node number registers 22 are '0', the output of the correspondence detection circuit 21 corresponding to the node number (0) is '1'.

When the node number (0) (data '0000') of the node at the peak of the tree structure shown in FIG. 1 is set in the node number register 22 and the data '00' of text T0 from text data input terminals TD0 and TD1 is entered into the circuit, the output of the correspondence detection circuit 21 corresponding to the node number (1). At this time, the lowest line of the memory section 25 shown at the right side of FIG. 2 is active and the output of the output circuit 28 having an intersection with a non-shaded dot 27 is '1'. More concretely, '0001' from the node number data output terminal 26, '1' from the code valid bit output terminal 29 and '0000000001' from the chain code data output terminal 30 are outputted respectively. In this case, the code valid bit output 29 indicates whether the data outputted from the chain code data output terminal 30 is valid or invalid, that is, whether or not a code number is assigned to the node which is given the node number outputted from the node number data output terminal 26. The code valid bit output 29 is '1' and therefore the data outputted from the chain code data output terminal 30 is valid but, in this case, the data outputted from the chain code data output terminal 30 is not used as a code number to be obtained. Data '0001' outputted from the node number data output terminal 26 is entered into the node number register 22.

When the data '01' of text T1 is entered into text data input terminals TD0 and TD1, the input of the decoder section 20 is '010001' since the output of the node number register 22 is '0001', the value obtained from the result of retrieval of the preceding text T0. The correspondence in this pattern is the node number (4) where the text T1 is arranged (refer to FIG. 1). Consequently, the output of the correspondence circuit 21 corresponding to the node number (4) is '1' and the fourth line from the bottom of the memory section 25 is active. Therefore the code valid bit output is '1', the chain code data output is '0000000100' and finally this chain code is obtained as a code number. At this time, the node number data '0100' is obtained but it is not used here.

Thus the retrieval and pattern matching comparison are carried out by referring to both the input data and the node number even when a number of branches are extended from respective nodes, and consequently high speed coding can be implemented.

In this case, the decoder section 20 is preferably constructed so that only the output of the correspondence detection circuit 21 of one line is always '1' for all retrieval data. If this construction is not realized and the decoder section 20 is constructed so that the outputs of a plurality of correspondence detection circuits 21 are simultaneously '1', determination of the data in the memory section 25 is complicated. Needless to say, the hardware can be constructed so that a plurality of outputs which have been simultaneously '1' may be outputted one by one while permitting that the outputs of a plurality of correspondence detection circuits are simultaneously '1'. On the contrary, the costs of the hardware can be reduced by contriving a method for preparing the tree structure data so that only one output is '1' simultaneously.

Figure 3:
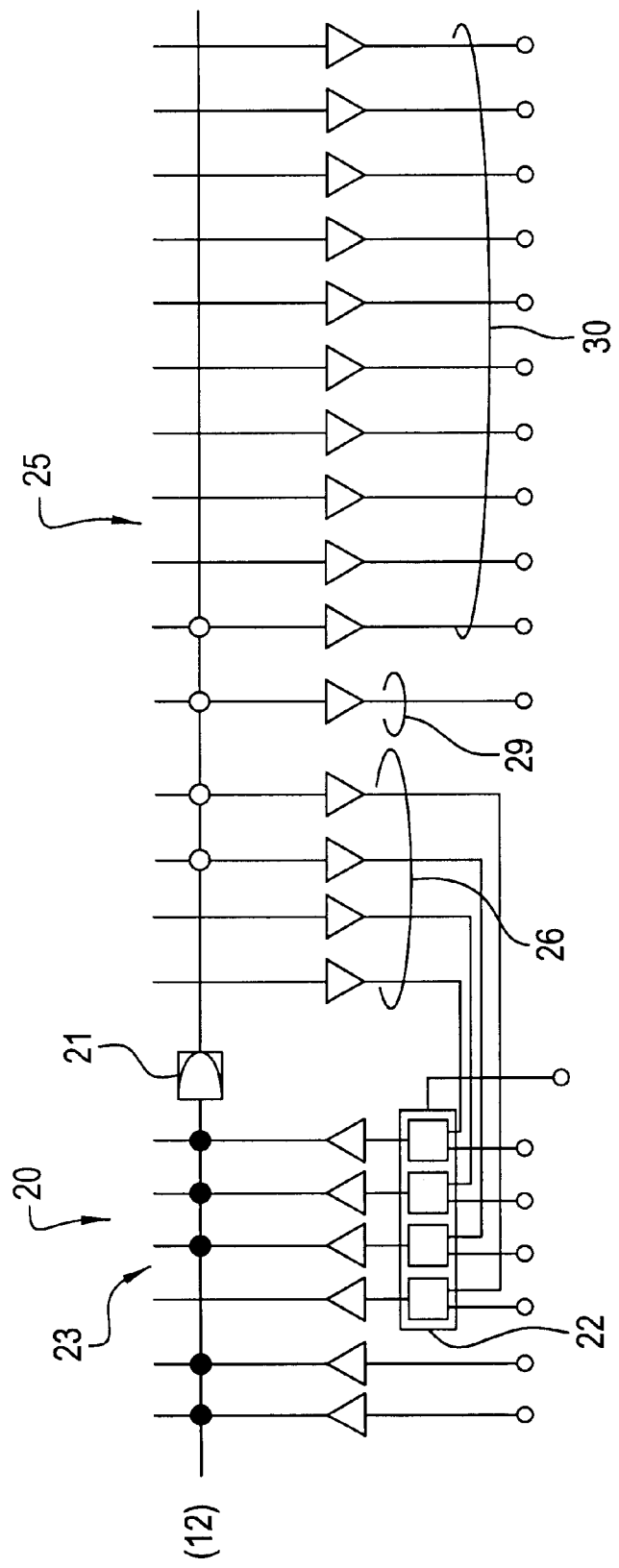
FIG. 3 is a circuit diagram showing a part of the coding apparatus shown in FIG. 2.
Figure 4:
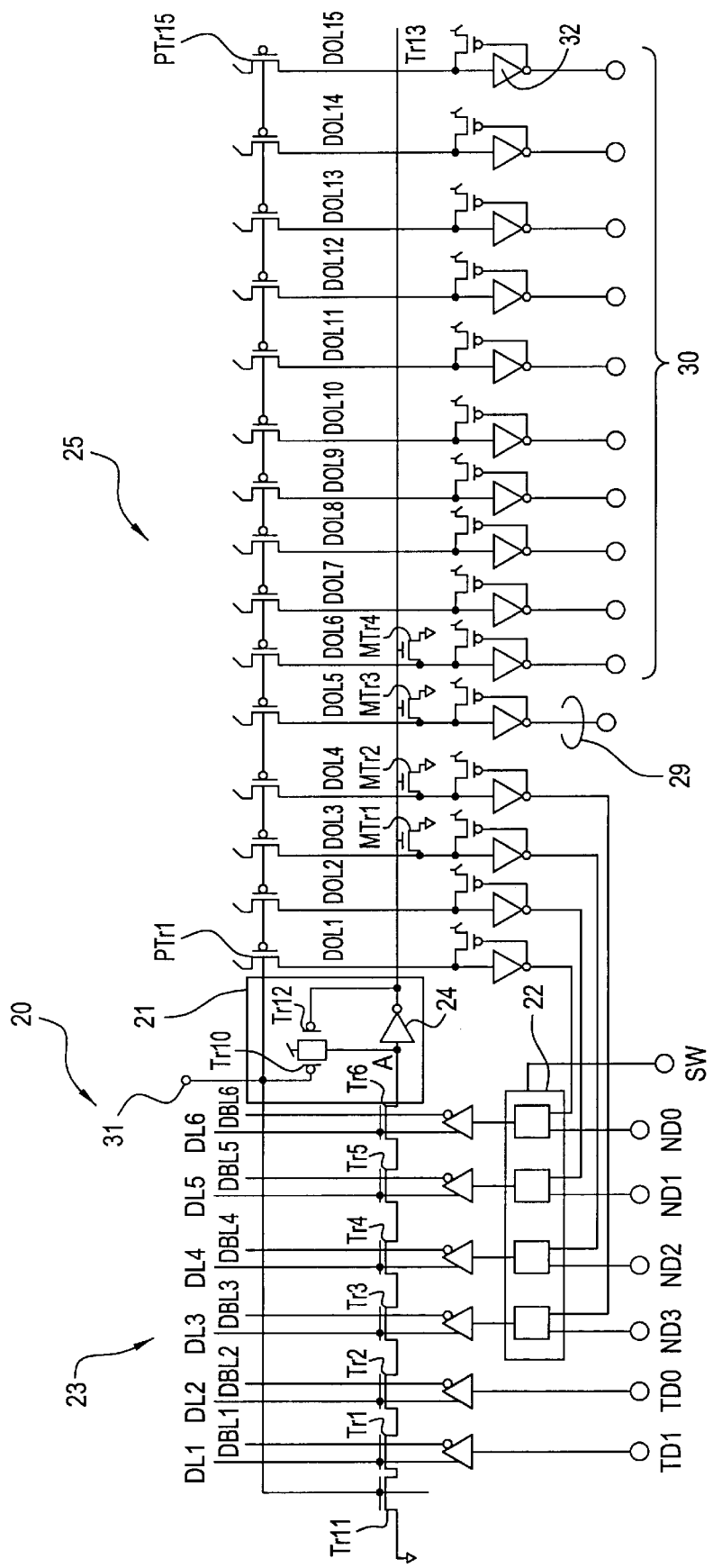
FIG. 4 is a circuit diagram which is a further embodiment of the circuit shown in FIG. 3, FIGS. 5A and 5B show is a diagram showing a correspondence detection circuit which remains unused.

FIG. 3 is a circuit diagram of a part of the semiconductor memory shown in FIG. 2 and FIG. 4 is a circuit diagram which is a further another embodiment of the circuit shown in FIG. 3. These FIG. 3 and FIG. 4 are respectively a circuit diagram corresponding to the node number (12) shown in FIG. 2 where the outputs of the correspondence detection circuit 21 are '1' with respect to the input data '11011' (text data is '11' and the output from the node number setting circuit 22 is '0111').

As shown in FIG. 4, the decoder section 20 comprises a number of comparison/detection circuits 23 each of which consists of seven transistors Tr1, Tr2, Tr3, Tr4, Tr5, Tr6 and Tr11 which are connected in series with the correspondence detection circuit 21, and either data lines DL1, DL2, DL3, DL4, DL5 and DL6 or data bar lines DBL1, DBL2, DBL3, DBL4, DBL5 and DBL6 are connected to the gates of six transistors Tr1, Tr2, Tr3, Tr4, Tr5 and Tr6 of these seven transistors. A precharging transistor Tr10 is provided as a P channel transistor for precharging the A point potential. The transistor Tr11 is an N type transistor provided between the transistor Tr1 and the ground to discharging of the A point potential during precharging. The correspondence detection circuit 21 consists of an inverter 24 and a feedback P channel transistor Tr12.

In the memory section 25, the output of the inverter 24 is connected to the gates of memory transistors MTr1, MTr2, MTr3 and MTr4. One side ends of these memory transistors MTr1, MTr2, MTr3 and MTr4 are connected to data output lines DOL3, DOL4, DOL5 and DOL6 and their other ends are connected to the ground.

In addition, precharging P channel transistor PTr1, . . . , PTr15 are formed on one-side ends of data output lines DOL1, . . . , DOL15 and the inverters 32 and the feedback P channel transistors Tr13 are provided on the other ends of the data output lines.

When '0' is applied to the precharge control terminal 31 for initialization, the A point potential is set to '1'. Accordingly, the output of the correspondence detection circuit 21 which is the inverter output of the A point potential becomes '0'. When the output of the correspondence detection circuit 21 '0', memory transistors MTr1, MTr2, MTr3 and MTr4 turn off and, when '0' is applied to the precharge control terminal 31, precharging P channel transistors PTr1, . . . , PTr15 turn on, data output lines DOL1, . . . , DOL15 maintain '1' and the output of the inverter 32 maintains '0'. In this case, the code valid bit output terminal also outputs '0'. This signal output indicates that the output of the chain code data is invalid.

Subsequently, when desired text data is entered from text data input TD0 and TD1, the output from the node number register 22 is determined and '1' is applied to the precharge control terminal 31, the retrieval starts.

When these initialization and retrieval are repeated synchronized with entry of input data, desired chain code data, that is, the code number can be obtained.

The above is an embodiment of the present invention, and the tree structure stored in this semiconductor memory need not be one type and a plurality of tree structure data can be simultaneously incorporated therein. In this case, however, the node numbers to be assigned to the respective nodes of all tree structure preferably, as a rule, differ one from another.

A number of comparison/detection circuits 23 shown in FIG. 4 are incorporated as standard provisions whereby the gate of the transistor Tr11 is connected to the precharge control terminal 31 and the gates of six transistors Tr1, Tr2, Tr3, Tr4, Tr5 and Tr6 are connected to data lines DL1, DL2, DL3 DL4, DL5 and DL6 or data bar lines DBL1, DBL2, DBL3, DBL4, DBL5 and DBL6. The corresponding relationship between the bit patterns to be determined according to the text data to be entered and the node numbers stored in the node number register 22 and the comparison/detection circuits 23 with which the output of the inverter 24 becomes active (H level) when the input side of the inverter 24 is discharged is specified by connecting six transistors Tr1, Tr2, Tr3, Tr4, Tr5 and Tr6 of comparison/detection circuits 23 respectively to data lines DL1, DL2, DL3 DL4, DL5 and DL6 or data bar lines DBL1, DBL2, DBL3, DBL4, DBL5 and DBL6.

Since a number of comparison/detection circuits 23 as shown in FIG. 4 are incorporated as standard provisions as described above, some of comparison/detection circuits 23 remain unused depending on the scale of the retrieval system (tree structure) which is formed therein. In this case, when the gates of transistors Tr1, Tr2, Tr3, Tr4, Tr5 and Tr6 of some remaining comparison/detection circuits 23 are appropriately connected to data lines DL1, DL2, DL3 DL4, DL5 and DL6 or data bar lines DBL1, DBL2, DBL3, DBL4, DBL5 and DBL6, an undesired H level signal may be inadvertently outputted from the inverter 24 of the comparison/detection circuits 23. On the other hand, if the gates of transistors Tr1, Tr2, Tr3, Tr4, Tr5 and Tr6 are kept in a floating condition without connecting to bit lines DL1, DL2, DL3 DL4, DL5 and DL6 or bit bar lines DBL1, DBL2, DBL3, DBL4, DBL5 and DBL6, the input side potential of the inverter 24 may not be primarily determined when the transistor Tr11 is conductive and the operation may be unstable.

Figure 5:
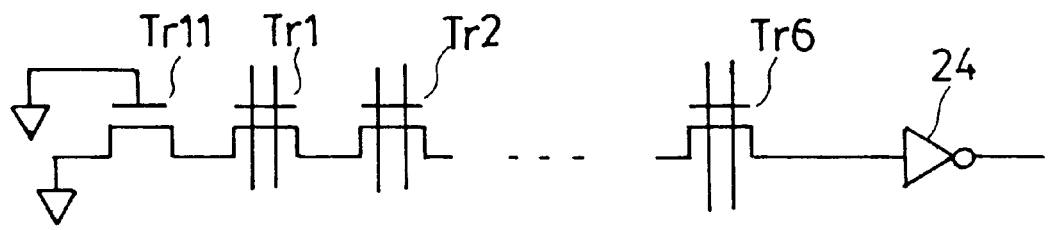
Figure 5:
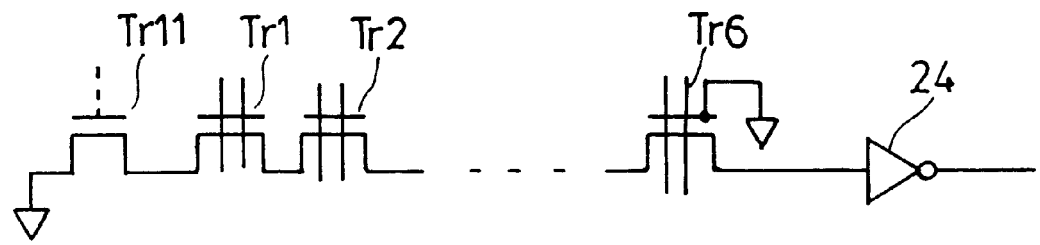

FIG. 5 shows the comparison/detection circuit which is given the above described measure.

The gate of transistor Tr11 is connected to the ground in FIG. 5(A) and the gate of transistor Tr6 is connected to the ground in FIG. 5(B). Thus a charge which is precharged at the input side of the inverter 24 is not discharged by certainly connecting the gate of at least one transistor of seven transistors Tr1, Tr2, Tr3, Tr4, Tr5, Tr6 and Tr11, which are connected in series, to the ground and holding it in a non-conductive state and therefore the output of the inverter 24 always stably maintains the L level (non-active).

A NAND type dynamic decoder to which the transistors with comparatively less power consumption are connected in series is described as an example of the comparison/ detection circuit. However, the semiconductor memory according to the present invention is not limited to this construction and can have a general associative memory type circuit configuration.

The following describes an example that the same node number is assigned to a plurality of nodes.

Figure 6:
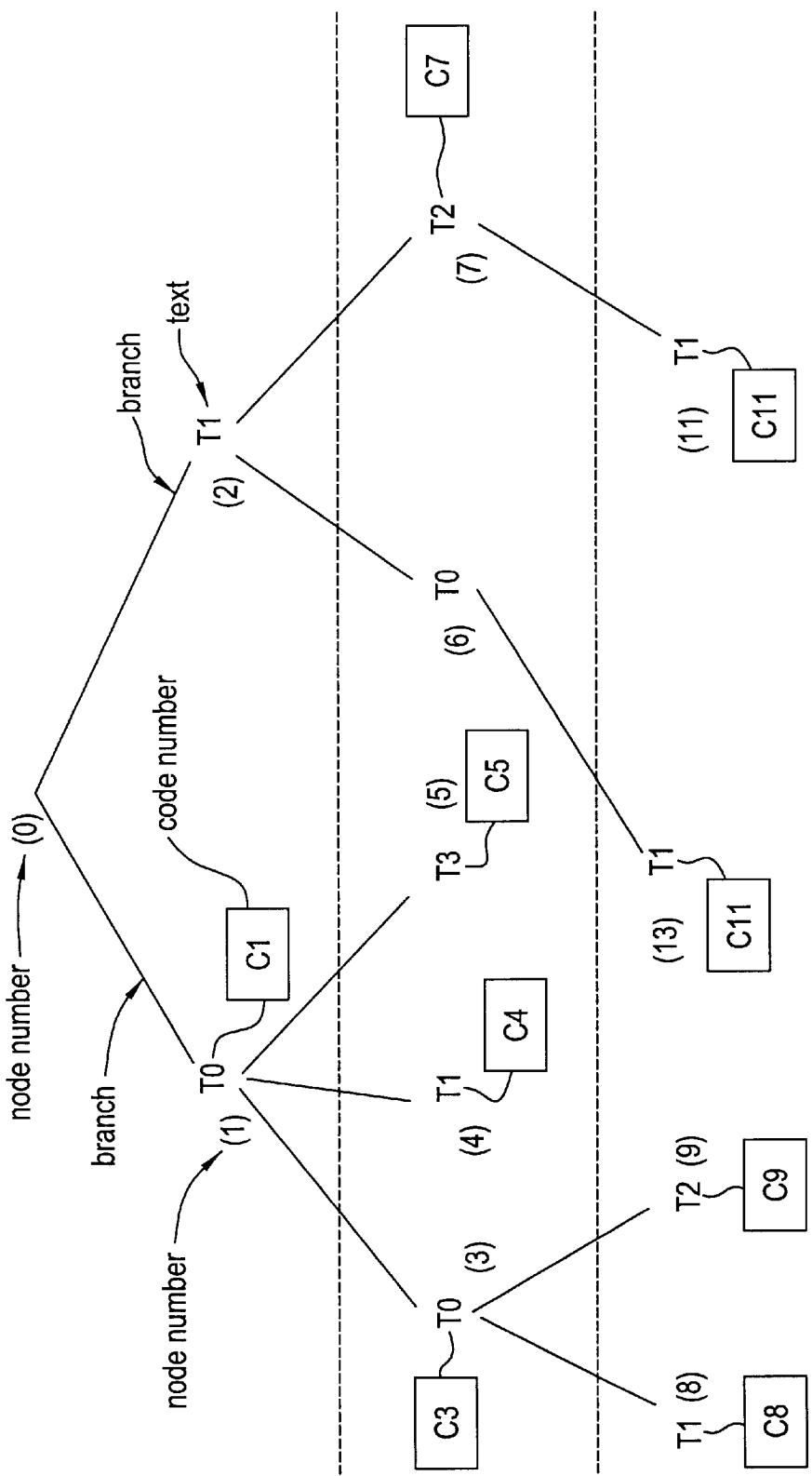
FIG. 6 is a diagram showing a data structure (tree structure) in accordance with another embodiment of the present invention.

FIG. 6 shows the data structure (tree structure) in accordance with another embodiment of the present invention. A difference from the data structure (tree structure) shown in FIG. 1 is that the data at the end of the branch extending from the node with the node number (6) at which the text T0 is arranged differs from that at the end of the branch extending from the node with the node number (7) at which the text T2 is arranged. The same code number C11 as assigned to the node of node number (11) is assigned to the node of the node (13).

Specifically, in this tree structure, the node of the node number (2) where the text T1 is arranged is branched to a node of node number (6) and a node of node number (7) and two nodes (a node of node number (11) and a node of node number (13)) where the same text T1 is arranged respectively and the same code number C11 is also assigned respectively are arranged at the extreme ends of these branches. In such case, the data structure (tree structure) can be modified as described below to be more compact.

Figure 7:
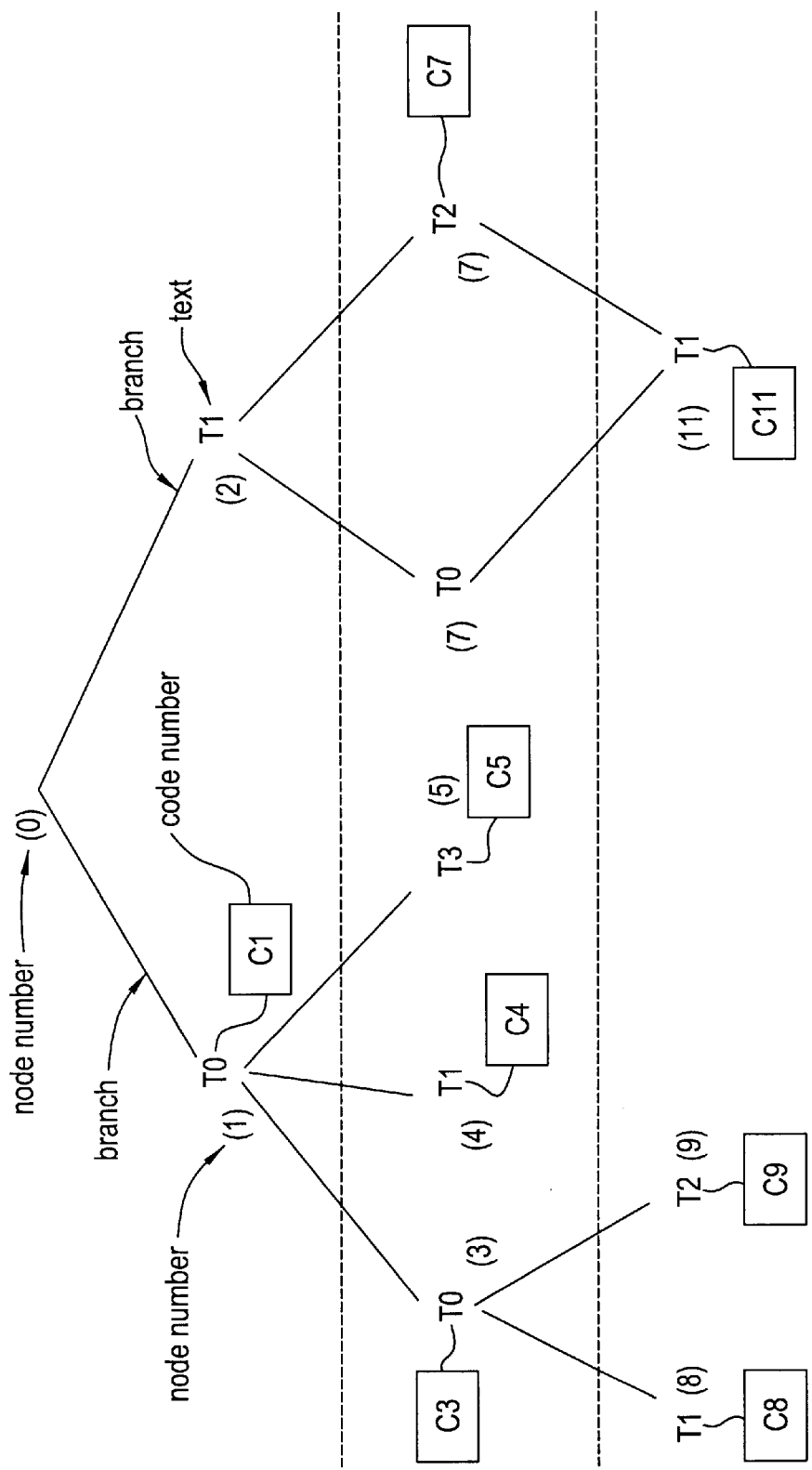
FIG. 7 is a diagram showing a modified data structure (tree structure)

FIG. 7 shows a modified data structure (tree structure).

In the tree structure shown in FIG. 7, the node number (6) of the node where the text T0 shown in FIG. 6 is arranged is changed to the same node number (7) as of the node where the text T2 is arranged and this node is connected with a branch to the node of the node number (11) where the text T1 is arranged. Thus the number of nodes can be reduced by unifying a plural number of nodes where the same text T1 and the same code number C11 are assigned into one node.

Figure 8:
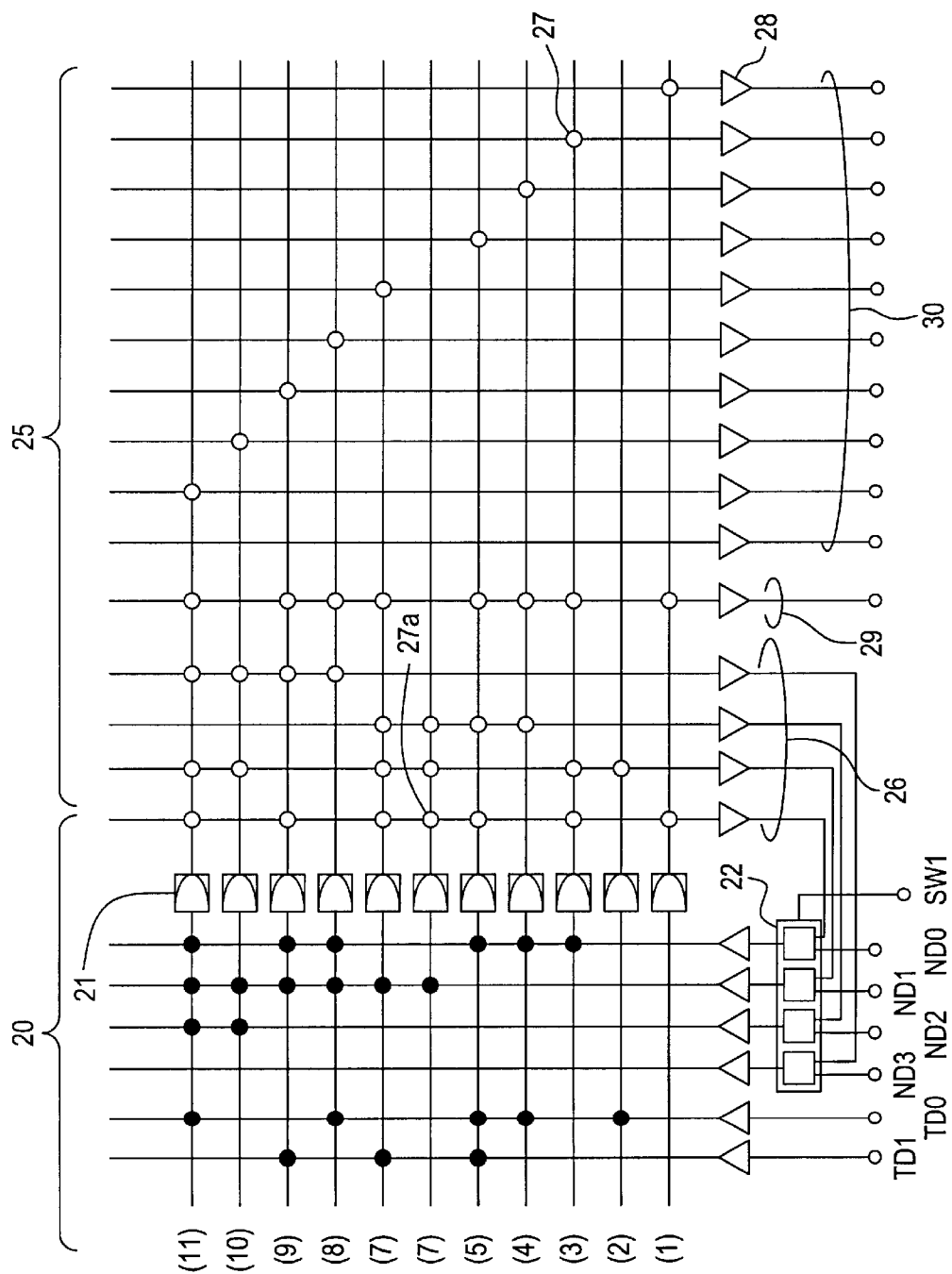
FIG. 8 is a diagram showing an example of the coding apparatus which is a hardware embodiment of the tree structure data base shown in FIG. 7.

FIG. 8 shows an example of the semiconductor memory for which the tree structure shown in FIG. 7 is a hardware embodiment.

A difference of the circuit shown in FIG. 8 from the circuit shown in FIG. 1 is that the node numbers (10) and (12) are not assigned, the node number (6) shown in FIG. 6 is changed to (7) (the actual circuit configuration in this point is not changed) and a circle 27a is added to the circuit shown in FIG. 1.

Equivalent functions can be realized with a compact circuit configuration by forming a tree structure (FIG. 7) in which those nodes where the same text T1 is arranged and the same code number C11 is assigned are unified into one node, instead of making the tree structure shown in FIG. 6 as a direct hardware embodiment.

Figure 9:
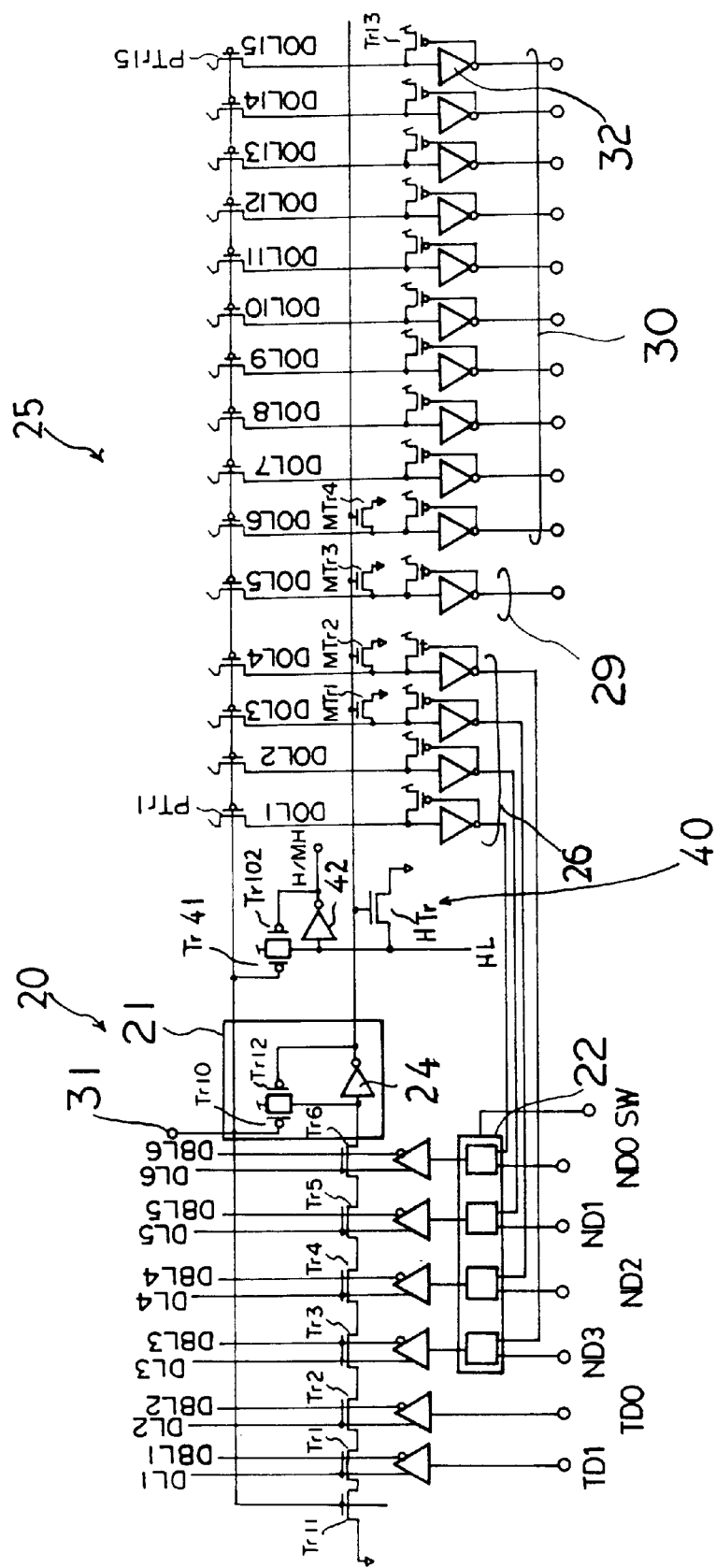
FIG. 9 is a diagram corresponding to FIG. 4 showing a configuration including a decoding circuit in accordance with an embodiment of the present invention.

FIG. 9 corresponds to FIG. 4 referred to the description of an embodiment of the semiconductor memory according to the present invention constructed to include a decoder which is an embodiment of the present invention. The same numbers and symbols as used in FIG. 4 are assigned to the circuit elements corresponding to those shown in FIG. 4 and only a difference is described.

A difference in the circuit shown in FIG. 9 from that shown in FIG. 4 is that a hit detection circuit 40 is provided in the former. This hit detection circuit 40 is provided with a hit detection line HL which extends in the vertical direction in the drawing and a hit detection transistors HTr as shown are provided at the intersections of the hit detection line HL and the correspondence detection circuit 21. Though only one hit detection transistor HTr is shown in FIG. 9, the hit detection line HL is extended in the vertical direction along the output terminals of a number of correspondence detection circuits 21 shown in FIG. 2 and the hit detection transistors HTr as shown in FIG. 9 are arranged at all intersections of a number of correspondence detection circuits 21 and the hit detection line Hl. This hit detection circuit 40 is provided with a precharging transistor Tr41 for precharging the hit detection line HL, an inverter 42 for sensing the potential of the hit detection line Hl and a latch transistor 43 for latching the output of the inverter 42.

When a '0' (L level) signal is entered from the precharge control terminal 31 before the contents stored in this semiconductor memory are sensed, the hit detection line HL is also precharged through the precharging transistor Tr41 at the same time precharging of other component parts.

After this, correspondence detection is carried out in the decoder section 20 and the output of the correspondence detection circuits 21, which match with a hit pattern determined in accordance with the node number set in the node number register 22 and the text data entered from text data input terminals TD0 and TD1, becomes active '1'. Even if the output of one of a number of correspondence detection circuits 21 becomes active '1', the charge precharged in the hit detection line HL is discharged through the hit detection transistor HTr corresponding to the correspondence detection circuit 21 which is made active, and a hit signal '1' which indicates that one of correspondence detection circuits 21 has been made active is outputted from the output terminal H/MH (output terminal of the inverter 42) of the hit detection circuit 40. On the other hand, if any one of correspondence detection circuits 21 does not match with the hit pattern determined by the node number and the text data and is not made active, all hit detection transistors HTr remain turned off, the hit detection line HL remains precharged and a mishit signal '0' indicating that any one of correspondence detection circuits 21 is not made active is outputted from the inverter 42.

In some cases, the semiconductor memory is constructed by dividing the decoder section and the memory section 25 shown in FIG. 2 into a plurality of blocks.

Figure 10:
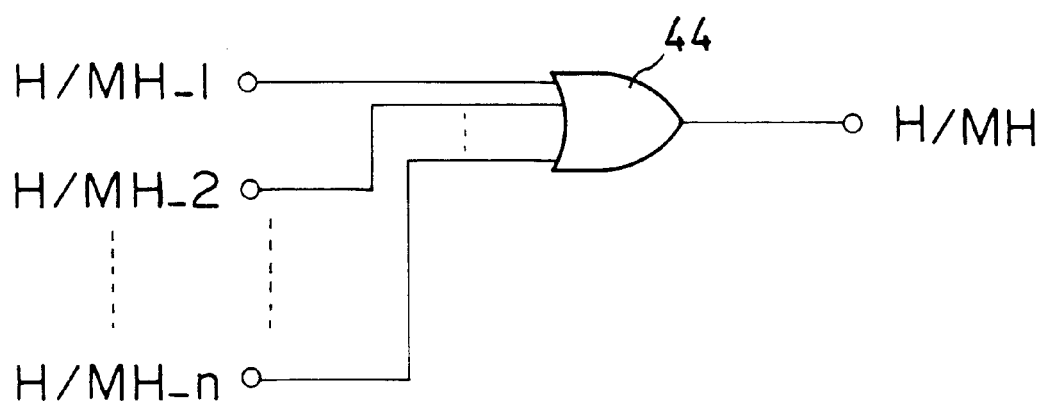
FIG. 10 is a partial circuit diagram of hit detection means of the semiconductor memory which is divided into a plurality of blocks.

FIG. 10 is a partial circuit diagram of a hit detection means the semiconductor memory which is divided into a plurality of blocks.

In the case the semiconductor memory is divided into a plurality of blocks, the hit detection circuit 40 described referring to FIG. 9 is provided for each block. When the output terminals of the hit detection circuit 40 for each block are assumed as H/MH_1, H/MH_2, . . . , H/MH_n, the signals outputted from these output terminals H/MH_1, H/MH_2, . . . , H/MH_n are entered into the OR circuit 44 and the output terminal of this OR circuit 44 is used as the output terminal H/MH_of the hit detection circuit as a whole to detect whether one of correspondence detection circuit 21 of one of the blocks is made active (hit '1') or any correspondence detection circuit 21 of any block is not made active (mishit '0').

Figure 11:
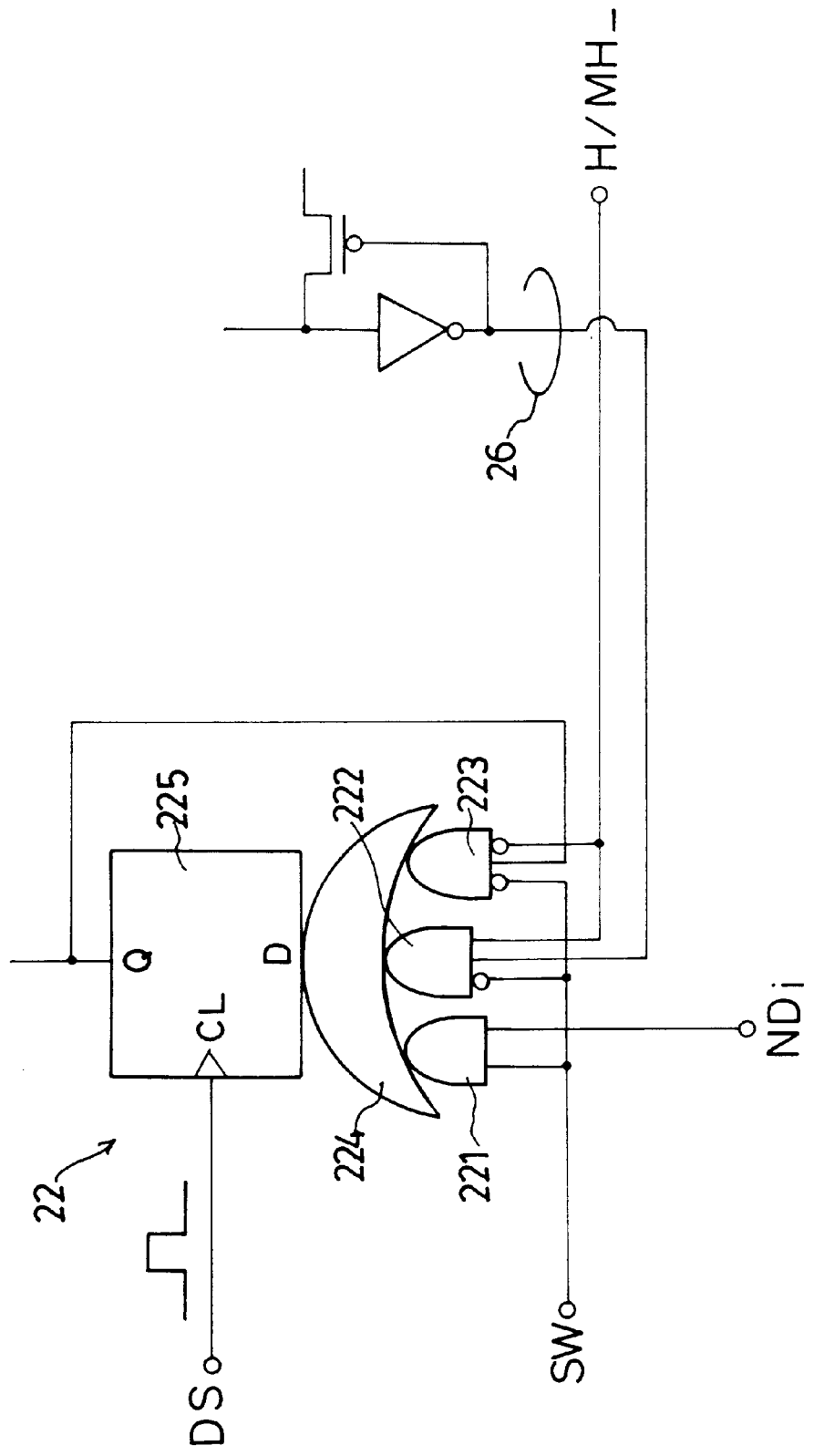
FIG. 11 is a circuit diagram for one bit of a node number setting circuit shown as a block shown in FIG. 9.

FIG. 11 is a circuit diagram for one bit of the node number register 22 shown as a block in FIG. 9.

The input changeover terminal SW is a terminal into which a switch signal for changing over setting of a node number entered from the node number setting terminal NDi (i=0, 1, 2 or 3; refer to FIG. 9) or a node number outputted from the node number data output terminal 26 in the node number register 22 is entered. When the switch signal is '1', a node signal entered from the node number setting terminal NDi is entered from the data input terminal D into the flip-flop circuit 225 through the AND circuit 221 and the OR circuit 224 and, when a pulse signal for setting data is entered from the data setting terminal DS into the clock input terminal CL of the flip-flop circuit 225, the node signal is set in the flip-flop circuit 225 according to the timing at that time. When the switch signal is '0', the AND circuit 221 is disconnected and the data passes through the AND circuit 222 or the AND circuit 223. Since the hit signal '1' is usually outputted from the output terminal H/MH_of the hit detection circuit 40 (refer to FIG. 9), a signal outputted from the node number data output terminal 26 is entered into the flip-flop circuit 225 through the AND circuit 222 and the OR circuit 224 and set in the flip-flop circuit 225 at the timing when the data setting pulse signal is entered.

When the mishit signal '0' is outputted from the hit detection circuit 40, the AND circuit 222 is also disconnected and the data is entered into the flip-flop circuit 225 through the AND circuit 223. In this case, the output terminal Q of the flip-flop circuit 225 is connected to one of input terminals of this AND circuit 223 and, if any correspondence detection circuit 21 (refer to FIG. 2) is not made active, the data set in the flip-flop circuit 225 is set again at the timing when the data setting pulse signal is entered and therefore the node number set in the flip-flop circuit 225 is held without any change.

In this embodiment, the hit detection circuits 40 are provided and the contents of the node number register 22 are preserved when the mishit signal is outputted from the hit detection circuit 40 and therefore the retrieval can be continued without restarting from the beginning even when wrong data is entered.

Figure 12:
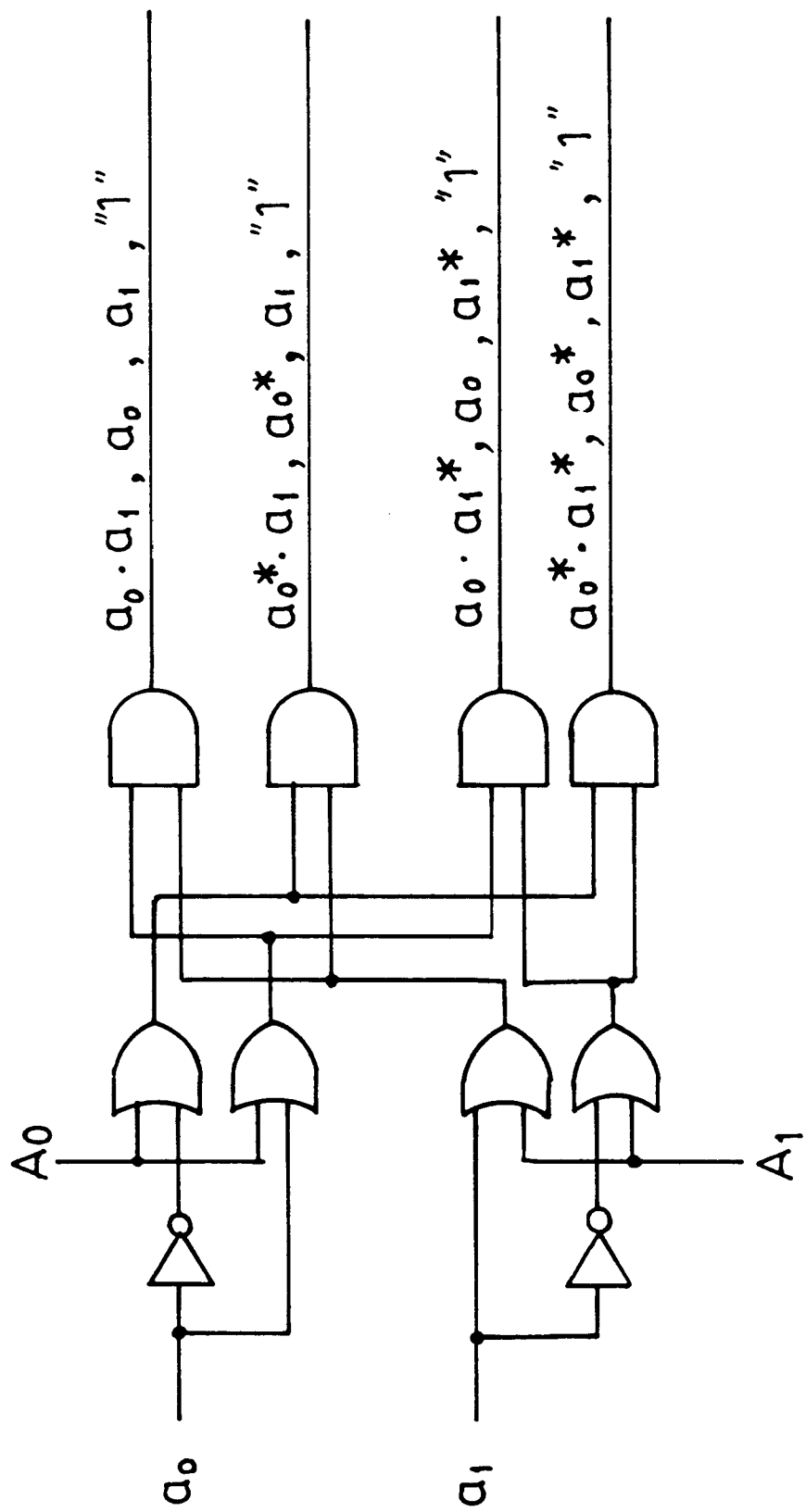
FIG. 12 is a circuit diagram illustrating a predecoder in an embodiment of the decoder according to the present invention.

FIG. 12 is a circuit diagram which includes the predecoder in an embodiment of the decoder of the semiconductor memory according to the present invention. This circuit is a partial circuit corresponding to the predecoder 17 in the circuit shown in FIG. 27.

Input signals $a_1$ and $a_0$ are directly entered or inverted and entered into the AND gates. The OR gates which form the DON'T CARE circuits are provided on halfway and a DON'T CARE signal $A_0$ or A1 in addition to the input signal $a_0$ or $a_1$ is entered into each OR gate. If DON'T CARE signals $A_0$ and A1 have a logic level "0", input signals $a_0$ and $a_1$, are directly entered or inverted and entered into the AND gates and the predecoder provides the same functions as the predecoder 17 shown in FIG. 27.

If the logic level of the DON'T CARE signal A1 is "1", the input signal $a_0$ is ignored and the input signal $a_0$ or the inversion signal $a^{0*}$ is outputted from the AND gates as shown in the drawing. Accordingly, this is the same as the case that there is no input line into which the input signal $a_1$ is entered.

If, similar to the above, the logic level of the DON'T CARE signal $A_0$ is '1', the input signal ao is ignored and the input signal $a_1$ or the inversion signal $a_1$* is outputted from the AND gates. This is the same as the case that there is no input line into which the input signal a0 is entered.

If the logic levels of DON'T CARE signals $A_0$ and $A_1$ are "1", all outputs of the AND gates have the logic level '1'. This is the same as the case that there are no input lines into which signals $a_0$ and $a_1$ are entered and accordingly the predecoder is not provided. Thus, if the DON'T CARE circuit is provided in the predecoder, the decoder for 16-bit signals can be provided to be used either for 16-bit signals or for 8-bit signals.

Figure 13:
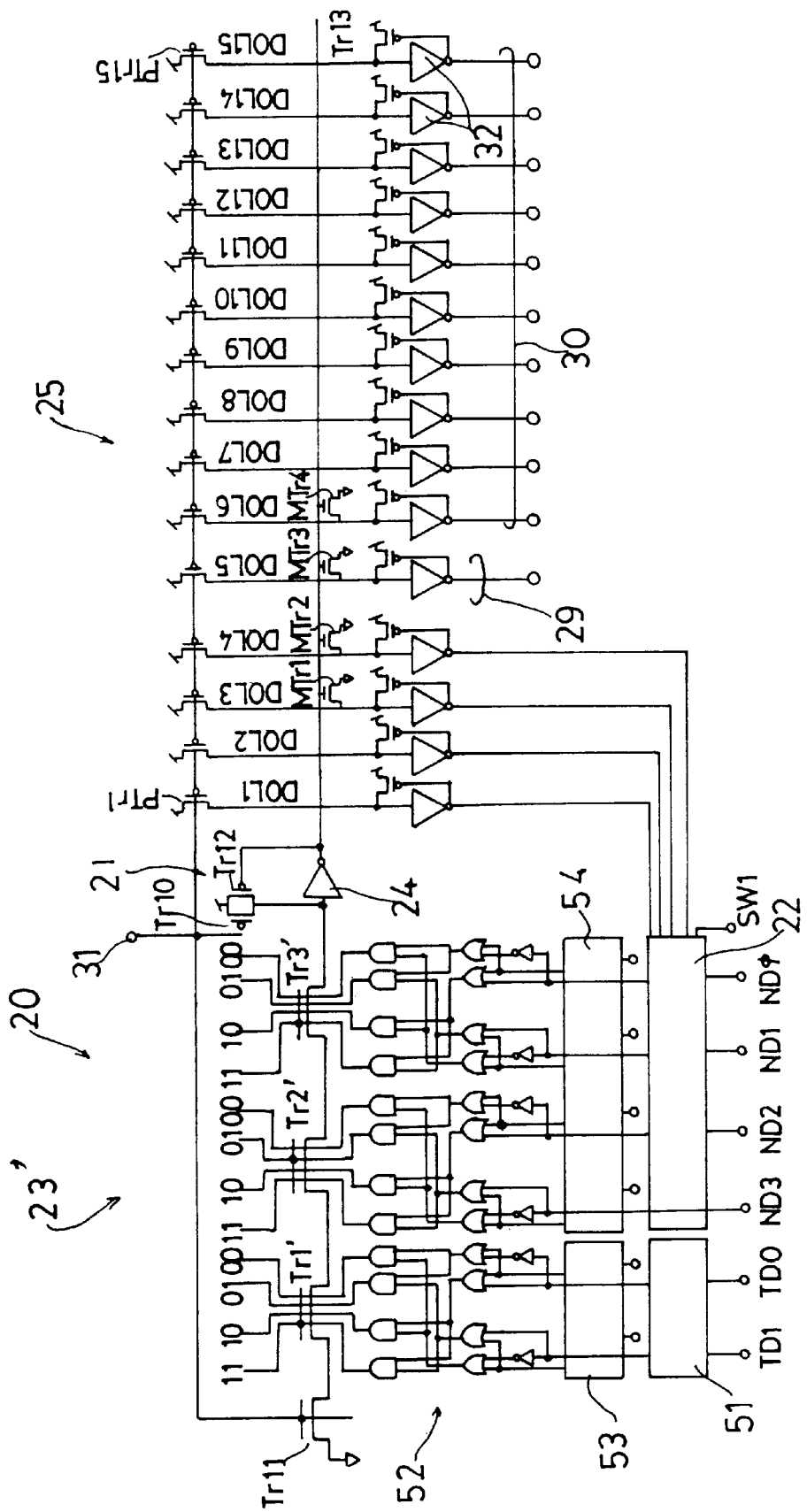
FIG. 13 is a diagram corresponding to FIG. 4 showing the semiconductor memory which incorporates a decoder provided with the predecoder.

FIG. 13 corresponds to FIG. 4 referred for description of an embodiment of the above described semiconductor memory according to the present invention in which the decoder provided with the predecoder shown in FIG. 12 is installed. Only a difference from FIG. 4 is described below.

This circuit is provided with a text data register 51 which stores those text data entered from an external source and the text data stored in this text data register 51 and the node numbers stored in the node number register 22 are entered into a predecoder 52 with the same configuration as shown in FIG. 12. The circuit shown in FIG. 13 is provided with a text data mask register 53 and a node number mask register 54 for storing mask data for masking, as required, the text data and the node numbers for each bit and the outputs of these registers are entered as the DON'T CARE signals into the predecoder 52.

The comparison/detection circuit 23' shown in FIG. 13 is provided with three transistors Tr1', Tr2' and Tr3' which are connected in series each other instead of six transistors Tr1, Tr2, . . . , Tr6 which are connected in series each other in the comparison/detection circuit 23 shown in FIG. 4 and four data lines are extended from the predecoder 52 respectively toward the gates of these three transistors Tr1', Tr2' and Tr3' and each one of four data lines is connected respectively to the gates of transistors Tr1', Tr2' and Tr3'.

Figure 27:
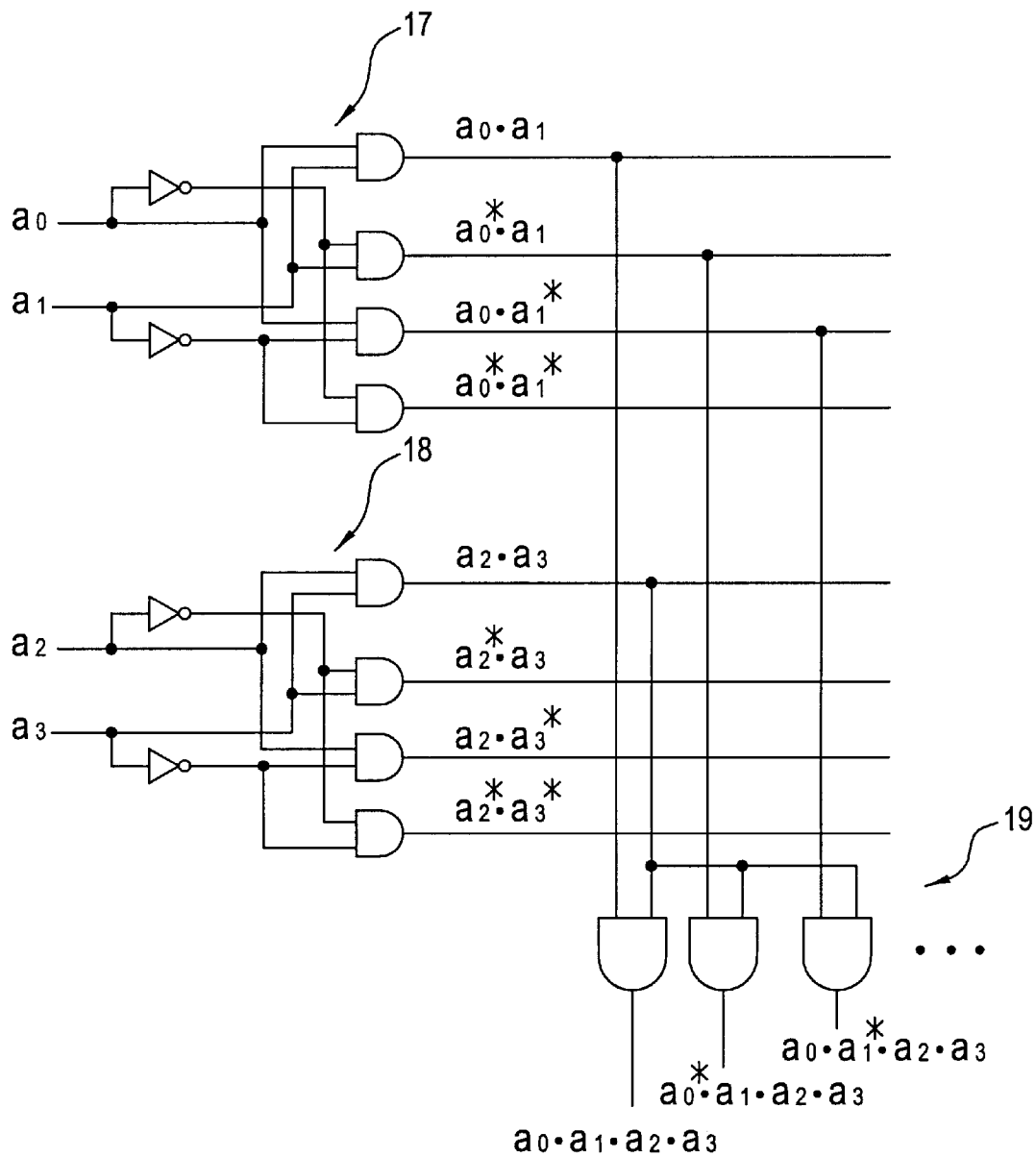
FIG. 27 is a circuit diagram illustrating an example of the predecoding type decoder.

In FIG. 13, the comparison/detection circuit 23', that is, three transistors Tr1', Tr2' and Tr3' correspond to the main decoder 19 shown in FIG. 27. Thus, the number of transistors which form the main decoder and are connected in series each other can be reduced, for example, by half by providing predecoder 52 and therefore high speed circuit operation (retrieval) can be implemented. The predecoder 52 is provided with the DON'T CARE circuit which masks the bits as required and therefore the semiconductor memory according to the present invention can be used as a general-purpose type even in applications where the numbers of bits of text data (shown with two bits for simplification in this description) and node numbers (similarly shown with four bits) vary.

Figure 14:
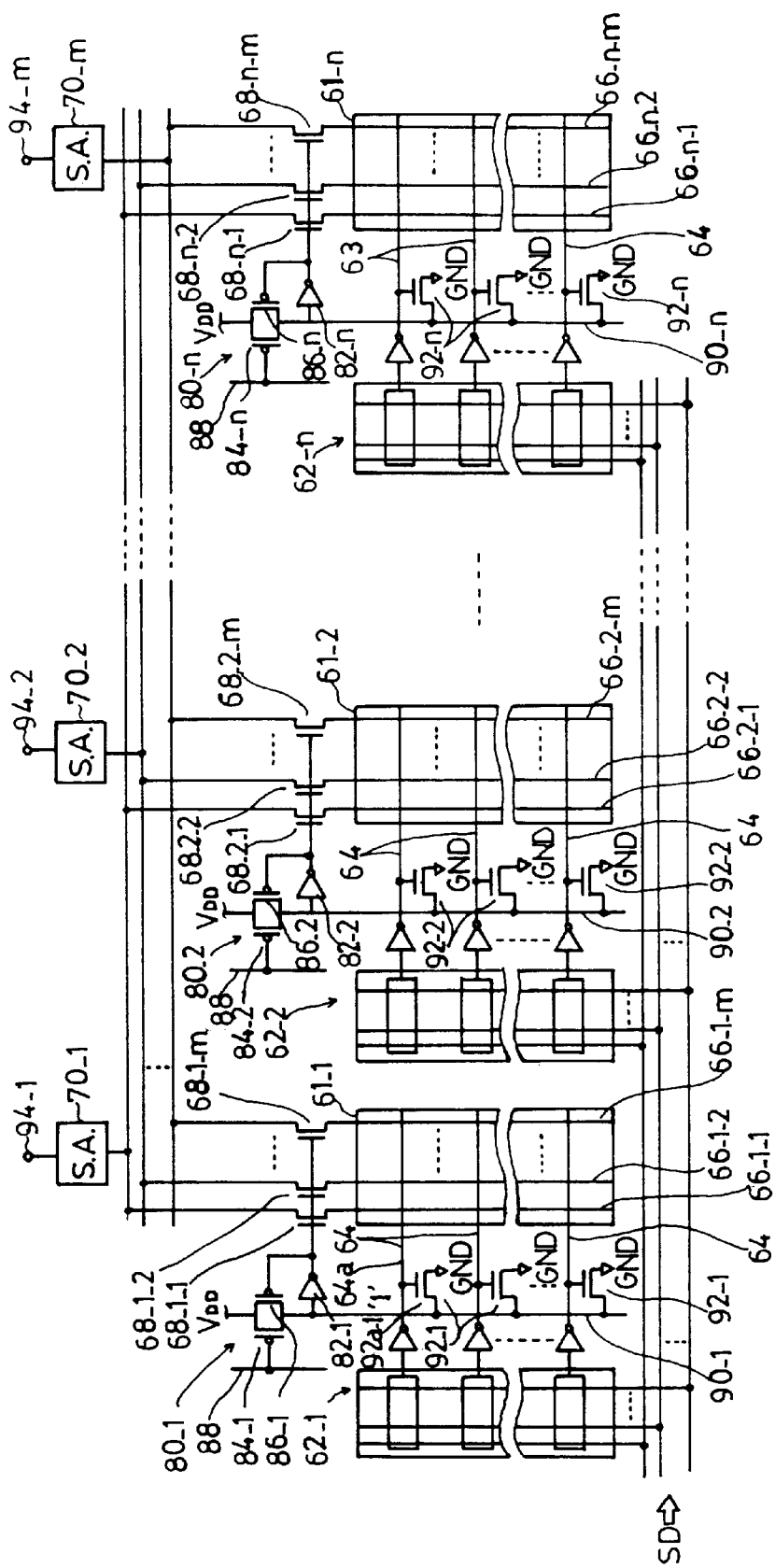
FIG. 14 is a circuit diagram showing an embodiment of the semiconductor memory in accordance with the present invention.
Figure 15:
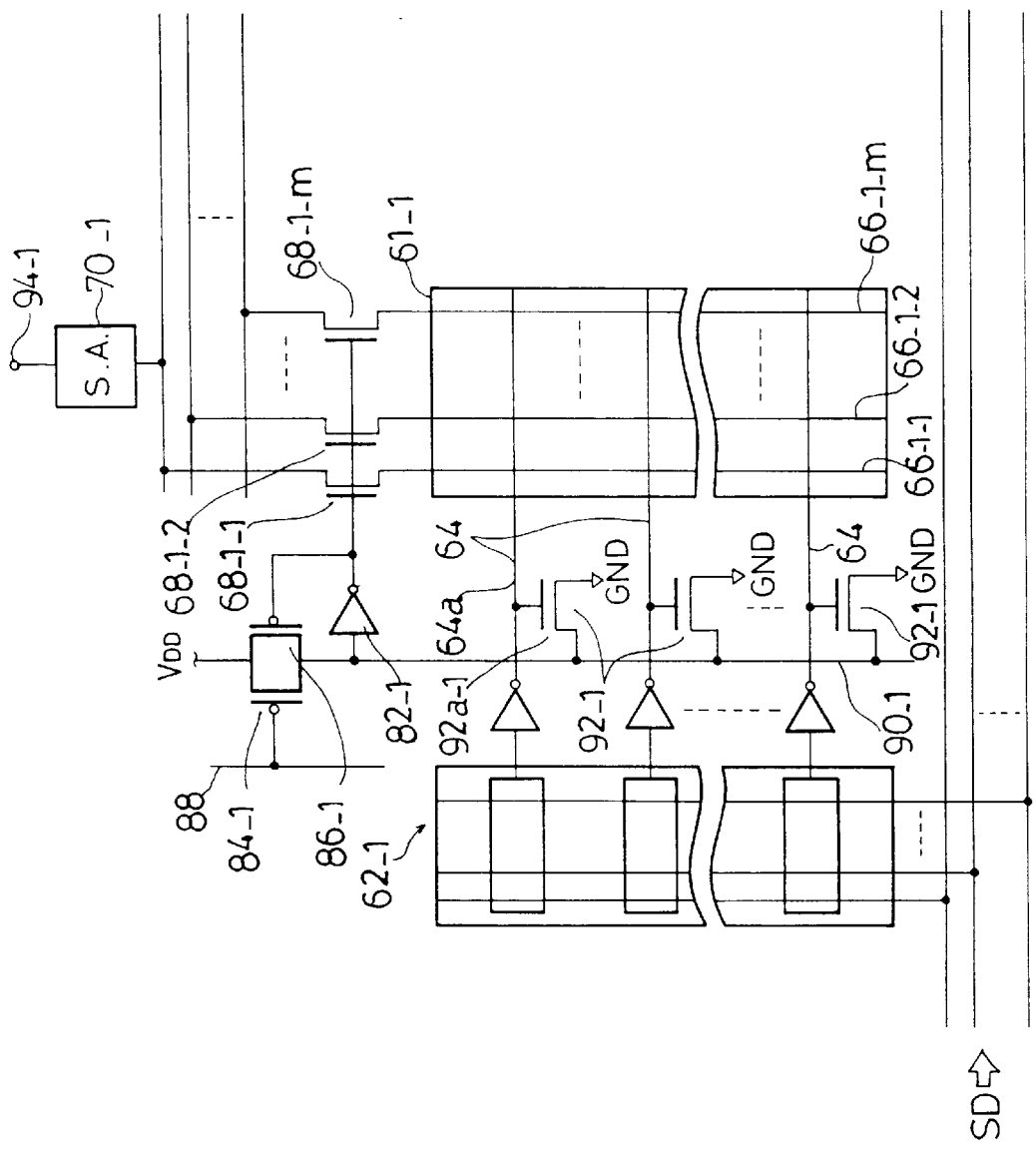
FIG. 15 is a partly magnified circuit diagram of the circuit shown in FIG. 14.

FIG. 14 is a circuit diagram showing an embodiment of the semiconductor according to the present invention and FIG. 15 is a partly magnified circuit diagram prepared from FIG. 14 for ease of understanding.

This semiconductor memory is provided with memory arrays 61_1, 61_2, . . . , 61_n which are divided into n sets of blocks each of which incorporates a number of memory areas each consisting of memory cells for the predetermined number of bits (m bits). In this embodiment, row decoders 62_1, 62_2, . . . , 62_n are also provided while being divided by n corresponding to the memory arrays 61_1, 61_2, . . . , 61_n. Each of one word lines 64 from row decoders 6_1, 62_2, . . . , 62_n is extended to the memory areas which form memory arrays 61_1, 61_2, . . . , 61_n. Row decoders 62_1, 62_2, . . . , 62_n are provided with the comparison data storage areas respectively corresponding to the memory areas which form memory arrays 61_1, 61_2, . . . , 61_n and comparison data is stored respectively in these comparison data storage areas.

Bit lines 66_1_1, 66_1_2, . . . , 66_1_n extending to the uppermost memory cells which form the memory areas of memory arrays 61_1, 61_2, . . . , 61_n are connected to the sense amplifier 70_1 through transistors 68_1_1, 68_2_1, . . . , 68_n_1, bit lines 66_1_2, 66_2_2, . . . , 66_n_2 extending to the second top memory cells which form the memory areas are connected to the sense amplifier 70_2 through transistors 68_1_2, 68_2_2, . . . , 68_n_2, and, similarly in the following, bit lines 66_1_m, 66_2_m, . . . , 66_n_m extending to the lowest memory cells which form the memory areas are connected to the sense amplifier 70_m through transistors 68_1_m, 68_2_m, ..., 68_n_m. The gates of these transistors 68_1_1, 66_2_1, ..., 66_n_1; 68_1_2, 66_2_2, ..., 66_n_2; ...; 68_1_m, 68_2_m, ..., 68_n_m are connected to the outputs of inverters 82_1, 82_2, ..., 82_n which respectively form block selection circuits 80_1, 80_2, ..., 80_n provided for respective blocks. The inputs of these inverters 82_1, 82_2, ..., 82_n are connected with the power supply VDD through two P type transistors 84_1, 86_1; 84_2, 86_2; ...; 84_n, 86_n. The gates of P type transistors 84_1, 84_2, 84_n of these two P type transistors 68_1_1, 66_2_1, ..., 66_n_1; 68_1_2, 66_2_2, ..., 66_n_2; ...; 68_1_m; 68_2_m, ..., 68_n_m are connected with the precharge line 88 and the gates of other P type transistors 86_1, 86_2, ..., 86_n are connected to the outputs of inverters 82_1, 82_2, ..., 82_n.

Sensing lines 90_1, 90_2, ..., 90_n connected to the inputs of inverters 82_1, 82_2, ..., 82_n are vertically extended in the drawing and grounded at the intersections with the word lines 64 through transistors 92_1, 92_2, ..., 92_n the gates of which are connected with the word lines.

In the semiconductor memory constructed as described above, readout operation is carried out as described below.

First, the precharge line 88 is set to the logic level '0'. At this time, the word line 64 remains to have the the logic level '0'. Sensing lines 90_1, 90_2, ..., 90_n are precharged through P type transistors 84_1, 84_2, ..., 84_n. After this, the precharge line 88 is reset to the logic level '1'.

Next, retrieval data SD is entered from an external source. When the retrieval data SD is compared with the comparison data for respective comparison data memory areas provided in the row decoders 62_1, 62_2, ..., 62_n and matches with the retrieval data, a decode signal of logic level '1' is outputted to a corresponding word line 64. In this case, it shall be assumed that a decode signal of logic level '1' is outputted to the uppermost word line 64a of the extreme left block in the drawing. In this case, the transistor 92a_1 the gate of which is connected to this word line 64a becomes conductive, the charge which has been precharged in the sensing line 90_1 is discharged through this transistor 92a_1 and the sensing line 90_1 has the logic level '0'. The logic level '0' of the sensing line 90_1 is inverted by the inverter 82_1 and outputted as the logic '1' signal from this inverter 82_1. Transistors 68_1_1, 68_1_2, ..., 68_1_m become conductive with this logic '1' signal and the memory cells of the memory array part 61_1 are connected to sense amplifiers 70_1, 70_2, ..., 70_m through these transistors 68_1_1, 68_1_2, ..., 68_1_m. Accordingly, the contents stored in the memory area corresponding to the word line 64a pass through the bit lines 66_1_1, 66_1_2, ..., 66_1_m and transistors 68_1_1, 68_1_2, ..., 68_1_m, amplified by sense amplifiers 70_1, 70_2, ..., 70_m and read out to output terminals 94_1, 94_2, ..., 94_m.

In this embodiment, the semiconductor memory is constructed so that memory arrays 61_1, 61_2, ..., 61_n, row decoders 62_1, 62_2, ..., 62_n and block selection circuits 80_1, 80_2, ..., 80_m are divided into n blocks, a desired block is selected according to a decode signal outputted to the word line 64 and the bit lines of the selected block are connected to the sense amplifiers and therefore the corresponding relationship between the retrieval data SD and the word lines to which the decode signals are outputted is unknown in advance and an appropriate block is selected even when a decode signal is outputted to a certain word line according to the retrieval data. Accordingly, the number of sense amplifiers (m amplifiers in the example shown in FIG. 14) can be reduced to be less than the number of bit lines (m×n bit lines in the example shown in FIG. 1) and therefore the bit lines can be arranged with smaller pitches to permit high density installation even though the sense amplifiers are large-sized.

In this embodiment, a desired block can be selected according to the decode signal and the configuration of the block selection circuit shown in FIG. 14 is only an example.

Figure 16:
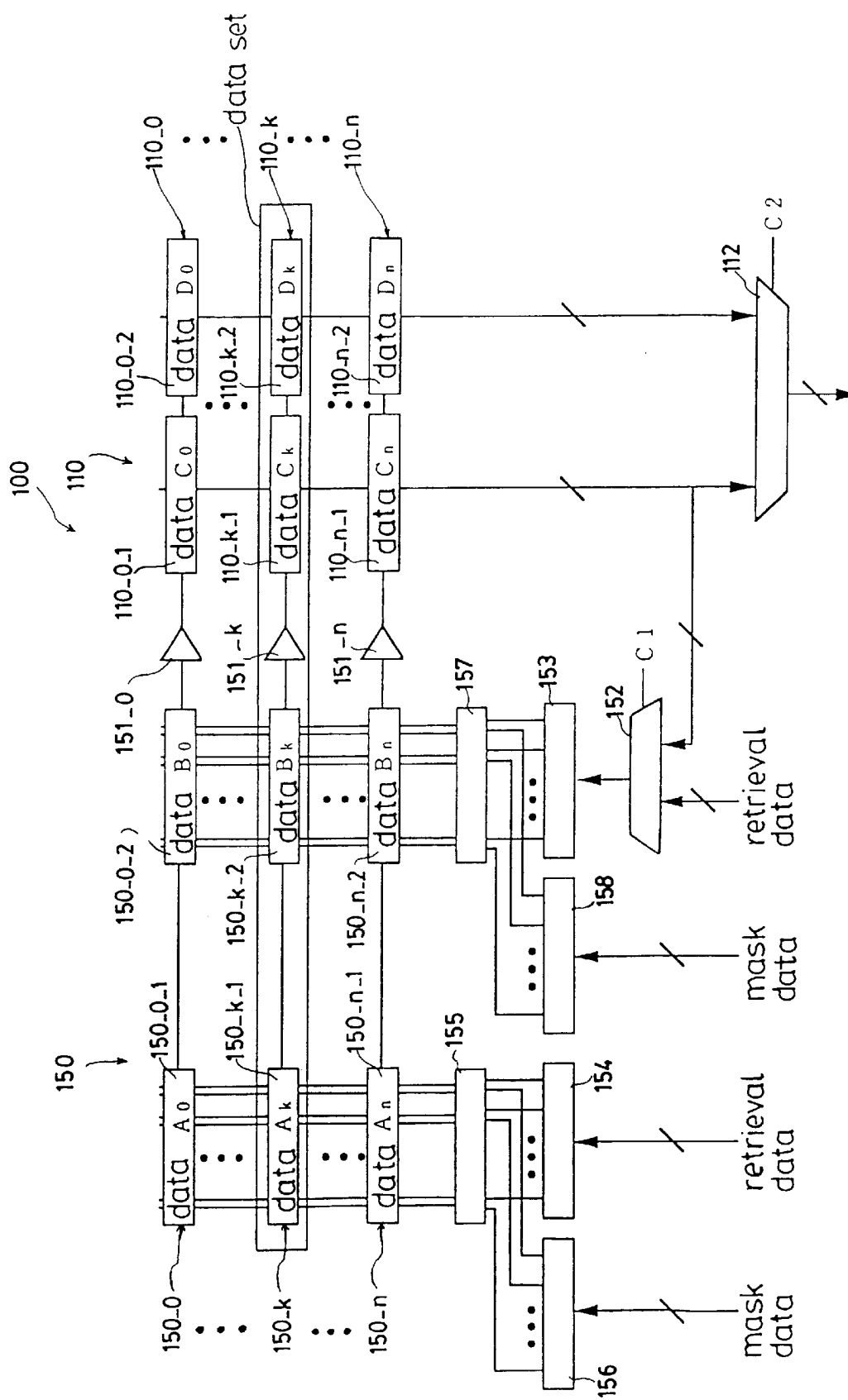
FIG. 16 is a block diagram showing the construction of the semiconductor memory in accordance with an embodiment of the present invention.

FIG. 16 is a block diagram showing the construction of the semiconductor memory as an embodiment of the present invention which is adapted to meet processing of both the tree structure data and the simple conversion table data.

Data read out by the retrieval is stored as the output data in the memory section 110 which forms the semiconductor memory 100. This memory section 110 is provided with a number of output data storage areas 110_0, ..., 110_k, ..., 110_n (n areas in this case), and the output data storage areas 110_0, ..., 110_k, ..., 110_n respectively comprise first output data storage areas 110_0_1, ..., 110_k_1, ..., 110_n_1 and second output data storage areas 110_0_2, ..., 110_k_2, ..., 110_n_2.

First output data $C_0, \ldots, C_k, \ldots, C_n$ are stored in the first output data storage areas 110_0_1, ..., 110_k_1, ..., 110_n_1 and second output data $D_0, \ldots, D_k, \ldots, D_n$ are stored in the second output data storage areas 110_0_2, ..., 110_k_2, ..., 110_n_2.

Output data read out from the memory section 110 (first output data $C_k$ and second output data $D_k$ represented by the subscript "$_k$" in this case) is entered into the output selector 112 and the first output data $Ck$ or the second output data $Dk$ is selectively outputted from this output selector 112 to the outside of the semiconductor memory 100.

The read-out first output data $C_k$ is also entered into the input selector 152. External retrieval data can also be entered into this input selector 152 and the first output data $C_k$ or the retrieval data entered from an external source is selectively entered as the second retrieval data into the data register 153 (the "register" referred in the present invention) according to the select signal C1.

In this semiconductor memory 100, the data at the retrieval side is stored in the correspondence detection part 150. The correspondence detection part 150 is provided with a number (n) of comparison data storage areas 150_0, ..., 150_k, ..., 150_n. The comparison data storage areas 150_0, ..., 150_k, ..., 150_n respectively comprise the first comparison data storage areas 150_0_1, ..., 150_k_1, ..., 150_n_1 and the second comparison data storage areas 150_0_2, ..., 150_k_2, ..., 150_n_2. First comparison data A0, ..., A$k$, ..., A$n$ are stored in the first comparison data storage areas 150_0_1, ..., 150_k_1, ..., 150_n_1 and second comparison data B0, ..., B$k$, ..., B$n$ are stored in the second comparison data storage areas 150_0_2, ..., 150_k_2, ..., 150_n_2.

The comparison data storage areas 150_0, ..., 150_k, ..., 150_n respectively correspond to the output data storage areas 110_0, ..., 110_k, ..., 110_n and the data sets are formed with the first comparison data A$k$ (represented by the subscript "k"), second comparison data B$k$, first output C$k$ and fourth output data D$k$.

The first retrieval data entered from an external source is set in the data register 154, entered into the first comparison data storage areas 150_0_1, ..., 150_k_1, ..., 150_n_1 through the masking circuit 155 and respectively compared with the first comparison data $A_0, \ldots, A_k, \ldots, A_n$. The first mask data is entered from an external source, set in the mask register 156 and entered into the masking circuit 155. This masking circuit 155 masks each bit of the first retrieval data entered from the data register 154 according to the first mask data and, more specifically, the masked bits are processed with the assumption that the first retrieval data set in the data register 154 and the first comparison data $A_0, \ldots, A_k, \ldots, A_n$ match with each other regardless of the values of these data (logic '0' or '1').

The second retrieval data entered from an external source or the first output data $C_k$ read out from the memory section 100 are entered into the input selector 152 as described above, and either of these data is outputted from the input selector 152 according to the select signal C1, set as the second retrieval data in the data register 153 and entered into the second comparison data storage areas 150_0_2, ..., 150_k_2, ..., 150_n_2 through the masking circuit 157. The second retrieval data entered into the second comparison data storage areas 150_0_2, ..., 150_k_2, ..., 150_n_2 is compared with the second comparison data $B_0, \ldots, B_k, \ldots, B_n$ stored in the second comparison data storage areas 150_n_2, ..., 150_k_2, ..., 150_n_2. The second mask data is entered from an external source, set in the mask register 158 and entered into the masking circuit 157. This masking circuit 157 similarly functions as the above described masking circuit 155.

Correspondence detection circuits 151_0, ..., 151_k, ..., 151_n corresponding to the data sets are provided between the correspondence detection part 150 and the memory section 110.

As described above, the first retrieval data set in the data register 154 and the first comparison data $A_0, \ldots, A_k, \ldots, A_n$ stored in the first comparison data storage areas 150_0_1, ..., 150_k_1, ..., 150_n_1 are compared and the second retrieval data set in the data register 153 and the second comparison data $B_0, \ldots, B_k, \ldots, B_n$ stored in the second comparison data storage areas 150_0_1, ..., 150_k_1, ..., 150_n_1 are compared and the decode signal is outputted from the correspondence detection circuit 151 corresponding to the comparison data storage area 150_k (represented by the subscript "k") where both data matches with each other. When this decode signal is outputted, the first output data $C_k$ and the second output data Dk, which are respectively stored in the first output data storage area 110_k_1 and the second output data storage area 110_k_2 which form this output data storage area 110_k, are read out from the output data storage area 110_k corresponding to the correspondence detection circuit 151_k which has outputted this decode signal. These read-out first output data $C_k$ and the second output data $D_k$ are entered into the output selector 112 as described above and either of these data is outputted to an external circuit, and the first output data $C_k$ is also entered into the input selector 152 and used as the second retrieval data for subsequent retrieval in accordance with the select signal C1.

For retrieval with the tree structure which is to be stored in the semiconductor memory 100 shown in FIG. 16, the same functions as the above described semiconductor memory (refer to FIG. 2~4) can be obtained by making the text data used in the description of the above described semiconductor memory (refer to FIG. 2~4) correspond to the first retrieval data and the node number correspond to the second retrieval data and outputting the second output data $D_k$ from the output selector. For retrieval with the simple conversion table data which is to be stored in the semiconductor memory 100 shown in FIG. 16, the data (for example, JIS codes) of the retrieving side is stored in the first comparison data storage areas 150_0_1, ..., 150_k_1, ..., 150_n_1 and the data (for example, new JIS codes) of the retrieved side is stored in the first output data storage areas 110_0_1, ..., 110_k_1, ..., 110_n_1, whereby, for example, the first comparison data storage area 150_0_1, ..., 150_k_1, ..., 150_n_1 and the first output data storage areas 110_0_1, ..., 110_k_1, ..., 110_n_1 are treated as the first pair, then the retrieval data is entered through the data register 154 and the output data corresponding to the entered retrieval data can be obtained. Similar retrieval can be executed with the second comparison data storage areas 150_0_2, ..., 150_k_2, ..., 150_n_2 and the second output data storage areas 110_0_2, ..., 110_k_2, ..., 110_n_2 as the second pair. Accordingly, the semiconductor memory shown in FIG. 16 can be effectively used even in the retrieval with the simple conversion table data stored without causing the correspondence detection part 150 and the memory section 110 to remain unused. The semiconductor memory 110 shown in FIG. 16 is suited to the retrieval of both the tree structure data and the simple conversion table data.

Figure 17:
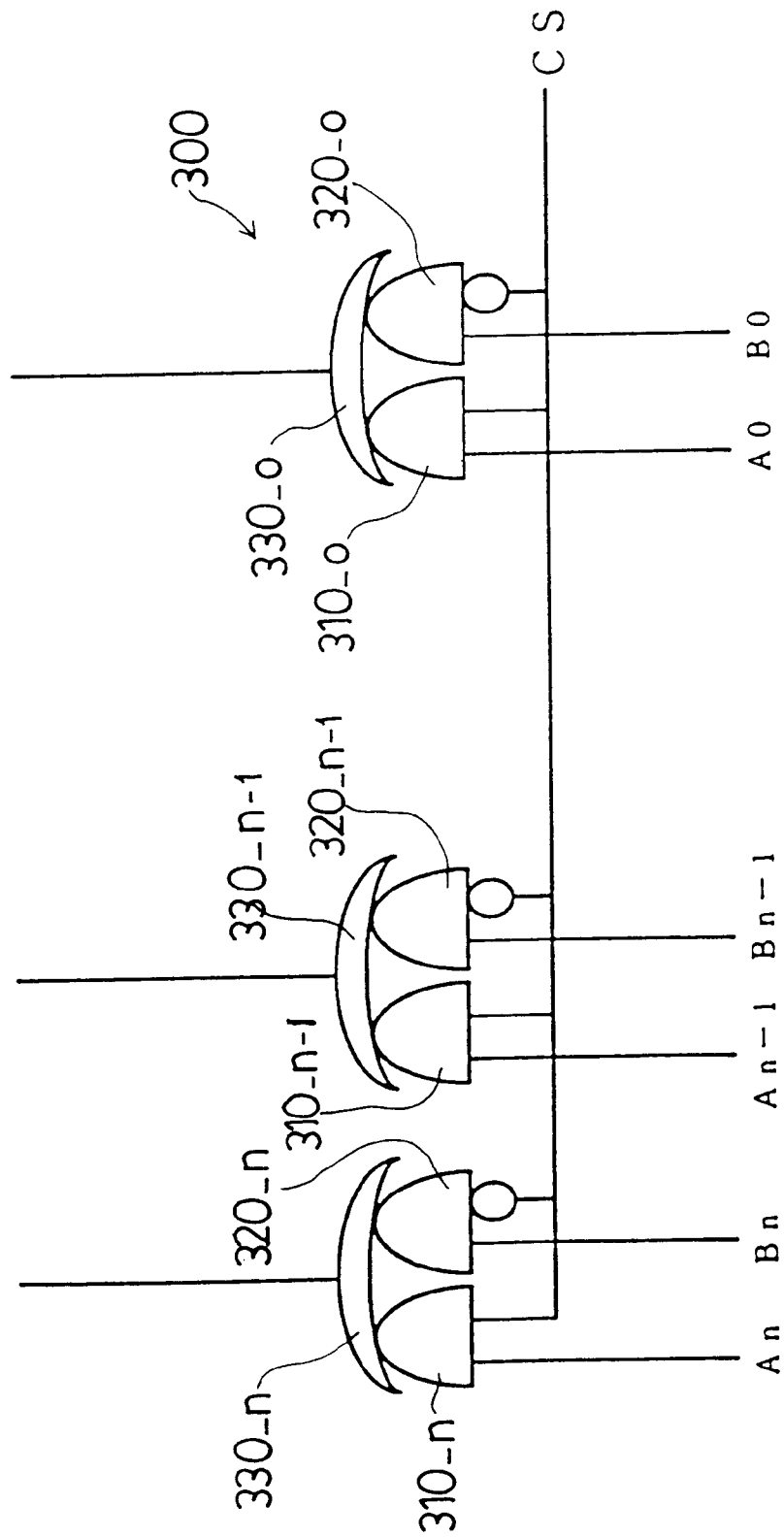
FIG. 17 is a circuit diagram showing an example of a selector.

FIG. 17 is a circuit diagram showing an example of the selector.

The semiconductor memory 100 shown in FIG. 16 employs the output selector 112 and the input selector 152. However, a selector 300 of the construction shown in FIG. 17 can be employed as the output selector 112 and the input selector 152.

Two sets of (n+1)-bit data {A$n$, A$n$-1, ..., A0} and {B$n$, B$n$-1, B0} are entered into this selector 300. First data {A$n$, A$n$-1, ..., A0} is entered into the first AND gates 310_n, 310_n-1, ..., 310_0 for each bit and second data {B$n$, B$n$-1, ..., B0} are entered into the second AND gates 320_n, 320_n-1, ..., 320_0 for each bit. A select signal CS is entered into the first AND gates 310_n, 310 n-1, ..., 310_0 and the inverted select signal CS is entered into th_second AND gates 320_n, 320_n-1, ..., 320_0. If the select signal has the logic level '1', the first data {A$n$, A$n$-1, A0} is outputted from this selector 300 through the first AND gates 310_n, 310_n-1, ..., 310_0 and further through the OR gates 330_n, 330_n-1, ..., 330_0. If the select signal has the logic level '0', the second data {B$n$, B$n$-1, ..., B0} is outputted from this selector 300 through the second AND gates 320_n, 320_n-1, ..., 320_0 and further through the OR gates 330_n, 330_n-1, ..., 330_0. As described above, two sets of data {A$n$, A$n$-1, ..., A0} and {B$n$, B$n$-1, ..., BO} are entered into this selector 300 and the first data {A$n$, A$n$-1, ..., A$_0$} or the second data {B$n$, B$n$-1, ..., B$_0$} is outputted from the selector 300 in accordance with the logic level of the select signal CS.

Figure 18:
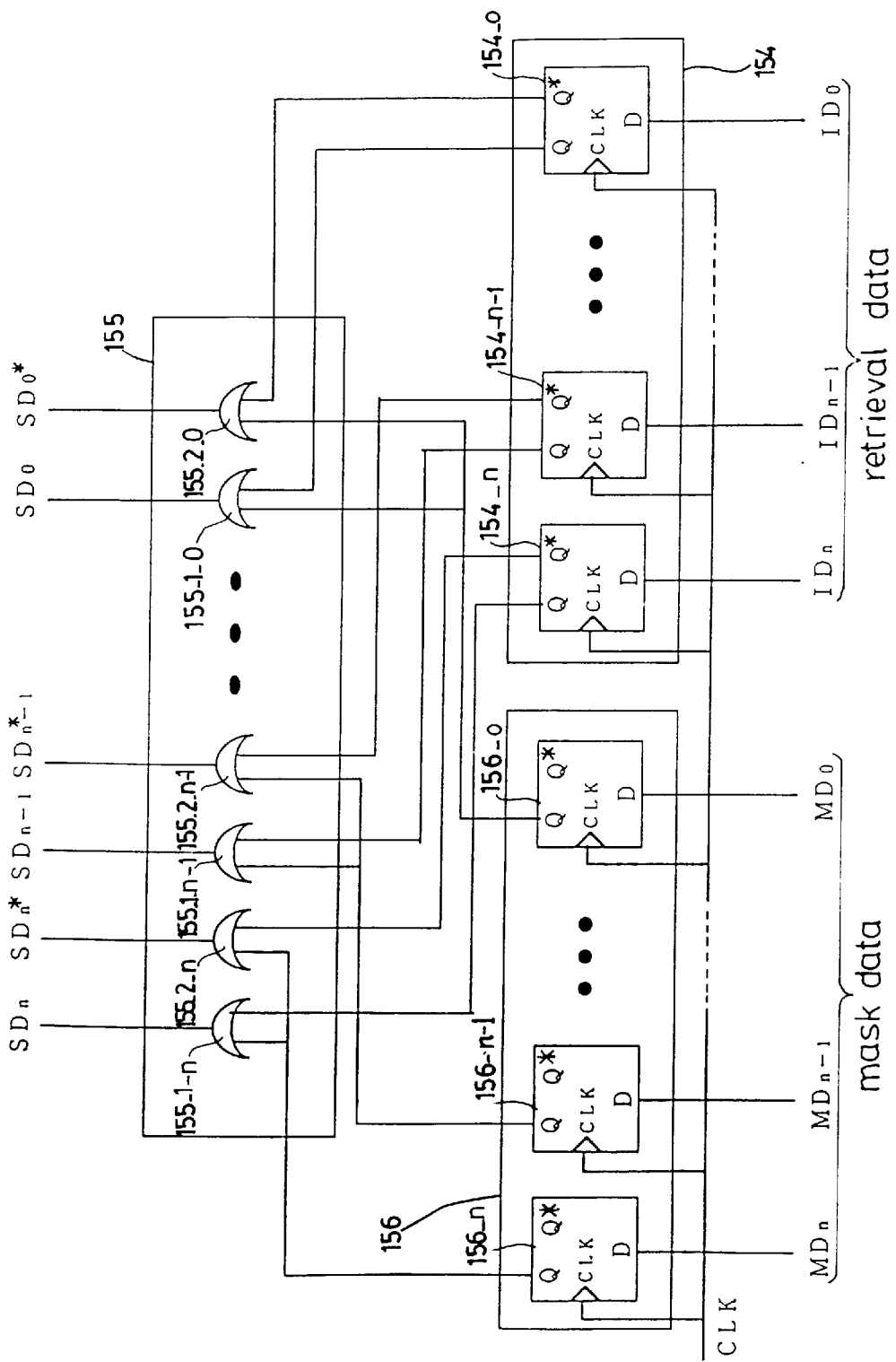
FIG. 18 is a diagram showing an example of the data register, mask register and mask circuit.

FIG. 18 shows examples of the data register, mask register and masking circuit.

The semiconductor memory 100 shown in FIG. 16 employs two sets of circuits shown in FIG. 18 as the data register 154, mask register 156 and masking circuit 155 and the data register 153, mask register 158 and masking circuit 157. In this case, the data register 154, mask register 156 and masking circuit 155 are described for convenience in reference to the symbols given. However, the description is the same with the other set of the circuit configuration.

The data register 154 and the mask register 156 are respectively provided with (n+1) D type flip-flop circuits 154_n, 154_n_1, ..., 154_0 and 156_n, 156_n_1, ..., 156_0, and the retrieval data { ID$_n$, ID$_{n-1}$, ..., ID$_0$} is entered bit by bit into the D input terminals of the D type flip-flop circuits 154_n, 154_n_1, ..., 154_0 which form the data register 154 and the mask data is entered bit by bit into the D input terminals of the D type flip-flop circuits 156_n, 156_n_1, ..., 156_0 which form the mask register 156. Clock signals are entered into the clock input terminals of these D type flip-flop circuits 154_n, 154_n_1, ..., 154_0 and 156_n, 156_n_1, ..., 156_0, and the retrieval data and the mask data entered at the rise timing of the clock signals are respectively set in the data register 154 and the mask register 156 at the rise timing of the clock signals.

The masking circuit 155 is provided with 2(n+1) OR gates 155_1_n, 155_1_n-1, ..., 155_1_0 and 155_2_n, 155_2_n-1, ..., 155_2_0. One end input terminals of OR gates 155_1_n, 155_1_n-1, ..., 155_1_0 are connected with the Q output terminals of the D type flip-flop circuits 154_n, 154_n_1, 154_0 which form the data register 154 and one end input terminals of the OR gates 155_2_n, 155_2_n-1, ..., 155_2_0 are connected with the Q* output terminals, which output those signals with the logic level reverse to the Q output terminals, of the D type flip-flop circuits 154_n, 154_n_1, ..., 154_0. The other end terminals of two sets of OR gates 155_1_n, 155_1_n-1, ..., 155_1_0 and 155_2_n, 155_2_n-1, ..., 155_2_0 are connected with the Q output terminals of the D type flip-flop circuits 156_n, 156_n_1, ..., 156_0 which form the mask register 156. If the logic '1' retrieval data IDn is, for example, entered into the D type flip-flop 154_n which forms the data register 154 and set at the rise of the clock signal, a logic '1' signal from the Q output terminal and a logic '0' signal from the Q* output terminal of the flip-flop 154 are outputted and these logic '1' and '0' signals are entered from one input terminal of OR gates 155_1_n and 155_2_n. If logic '0' mask data MDn is set in the D type flip-flop 156_n which forms the mask register 156 when the logic '1' retrieval data IDn is to be set in the D type flip-flop 154_n, a logic '0' signal is outputted from the Q output terminal of the D type flip-flop 156_n and entered through the other end input terminals of two OR gates 155_1_n and 155_2_n. At this time, a logic '1' signal $SD_n$ is outputted from the OR gate 155_1_n and a logic '0' signal $SD_n$* is outputted from the OR gate 155_2_n. On the contrary, if logic '0' retrieval data $ID_n$ is set in the D type flip-flop 154_n which forms the data register 160 and logic '0' mask data is set in the D type flip-flop which forms the mask register 156, a logic '0' signal $SD_n$ and a logic '1' signal $SD_n$* are outputted from the OR gates 155_1_n and 155_2_n, respectively.

When a logic '1' mask signal MDn is set in the D type flip-flop 156_n which forms the mask r egister 156, logic '1' signals $SD_n$* and $SD_n$* are outputted from the both OR gates 155_1_n and 155_2_n regardless that the retrieval data IDn set in the D type flip-flop 154_n which foorms the data register 154 has the logic level '1' or '0'. In other words, if the mask data {$MD_n$, $MD_{n-1}$, ..., $MD_0$} all bits of which are logic '0' are set in the mask register 156, the retrieval data {$ID_n$, $ID_{n-1}$, ..., $ID_0$} set in the data register 154 is outputted as signals {$ID_n$, $ID_{n-1}$, ..., $ID_0$} with the initial bit pattern from the masking circuit 155 and, if logic '1' data MDi is included in the mask data {$MD_n$, $MD_{n-1}$, ..., $MD_0$} both output signals $SD_i$ and $SD_1$* of the masking circuit 155 corresponding to the data $MD_1$ have the logic level '1'.

Connections of the output terminals of OR circuits 155_1_n, 155_1_n-1, ..., 155_1_0 and 155_2_n, 155_2_n-1, ..., 155_2_0 which form the masking circuit 155 are described later. A configuration which allows masking for each bit (both signals SDi and $SD_i$ * shall be logic '1') has been described. In the case that masking of each bit is not required, however, whether all bits should be masked or masking should be cancelled can be selected for each of the first and second masking circuits (masking circuits 155 and 157 of the semiconductor memory 100 shown in FIG. 16) can be selected.

Figure 19:
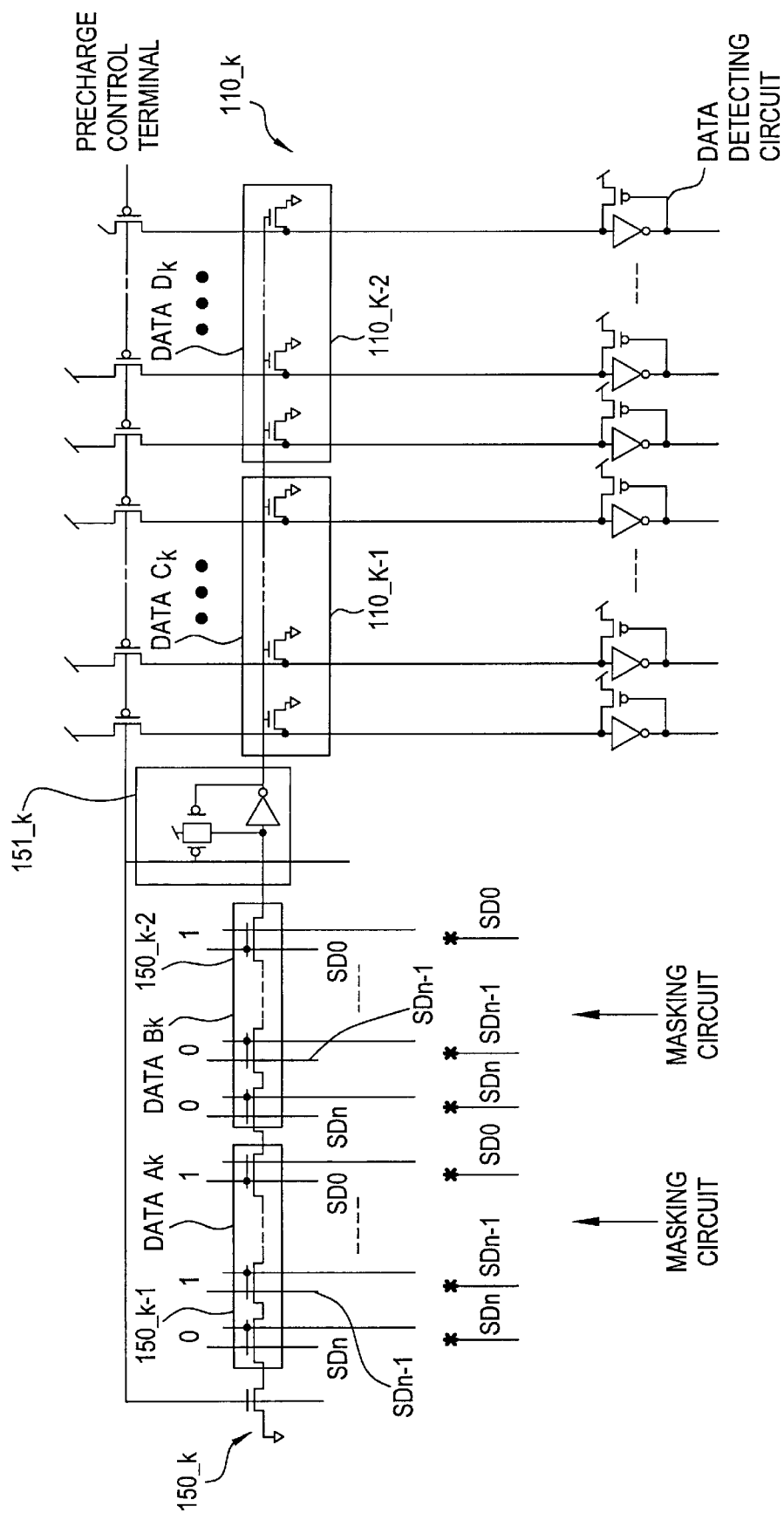
FIG. 19 is a circuit diagram showing part of the semiconductor memory shown in FIG. 16.

FIG. 19 is a circuit diagram showing part of the semiconductor memory shown in FIG. 16. To avoid complexity, only the kth data set is shown. The basic configuration of the circuit part shown in FIG. 19 is similar to the circuit shown in FIG. 4 and therefore only the operation is described. For the purpose of simplification, the same symbols are used for signal lines and signals to be transmitted through these signal lines without discrimination.

Data lines $SD_n$, $SD_{n-1}$, ..., $S_0$ and data bar lines $SD_{n*}$, $SD_{n-1*}$, ... $SD_{0*}$ extending from the masking circuits 155 and 157 (refer to FIG. 16) which respectively have a configuration shown in FIG. 18 are extended to the first comparison data storage area 150_k_1 and the second comparison data storage area 150_k_2 and the gates of N type transistors which are connected in series each other to form these first comparison data storage area 150_k_1 and second comparison data storage area 150_k_2 are connected to one of the data lines $SD_n$, $SD_{n-1}$, $SD_0$ and data bar lines $SDn_*$ $SD_{n-1*}$, ..., $SD_{0*}$. This connection to one of the data lines and the data bar lines means that the first correspondence data Ak and the second correspondence data Bk are stored respectively in the first comparison data storage area 150_k_1 and the second comparison data storage area 150_k_2. When a logic '1' signal is transmitted to both the data line SDi and the data bar line $SD_{i*}$, the corresponding transistors become conductive even though the gates of these transistors are connected to the data line $SD_i$ or the data bar line $SD_{i*}$. In other words, the data is regarded matched with respect to this bit i.

For the retrieval operation with the tree structure data stored, both the first comparison data storage area 150_k_1 and the second comparison data storage area 150_k_2 are simultaneously used for retrieval and, when a logic '1' signal is outputted from the correspondence detection circuit 150_k, the first output data $C_k$ and the second output data Dk are read out and the first output data $C_k$ is used for retrieval in the following stage as required.

For the retrieval operation with the simple conversion table data stored, one of the first comparison data storage area 150_k_1 and the second comparison data storage area 150_k_2 is masked and the other is used for retrieval and one of the first output data $C_k$ and the second output data $D_k$ which have been read out is outputted through the output selector 120 shown in FIG. 16.

Figure 20:
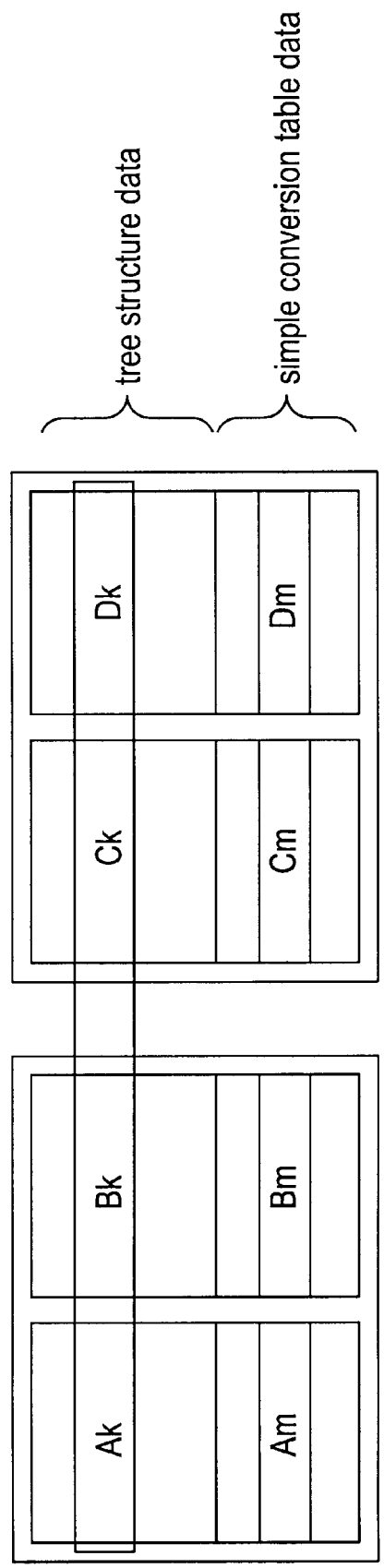
FIG. 20 is a typical diagram showing an example of the data structure stored in the semiconductor memory shown in FIG. 16.

FIG. 20 is a typical diagram showing an example of the data structure stored in the semiconductor memory shown in FIG. 16.

As shown in FIG. 16, both the tree structure data and the simple comparison table data can be stored in one semiconductor memory.

In the embodiment shown in FIG. 16, both the first output data $C_k$ and the second output data $D_k$ which have been read out from the memory section 110 may be outputted without through the output selector 112 and therefore the output selector is not always required. In addition, the data register 154 and the mask registers 156 and 158 are not always required and the timing of data entered from an external circuit can be externally controlled.

Figure 21A:
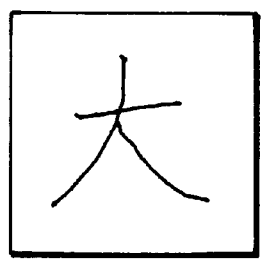
FIGS. 21A and 21B is a diagram illustrating a hand-written character "大" to be entered and an example of the stroke chain.
Figure 21B:
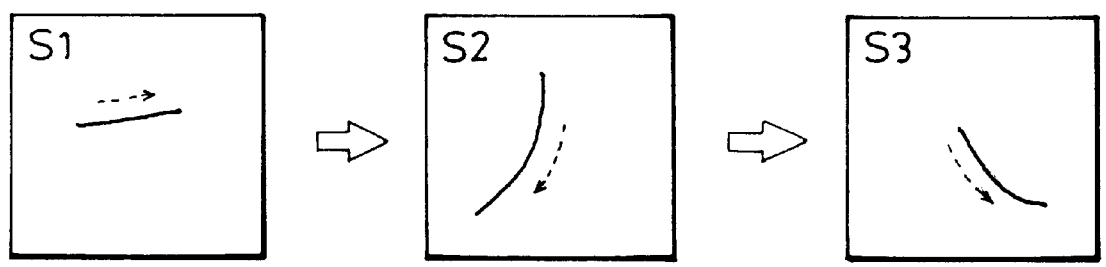
Figure 22:
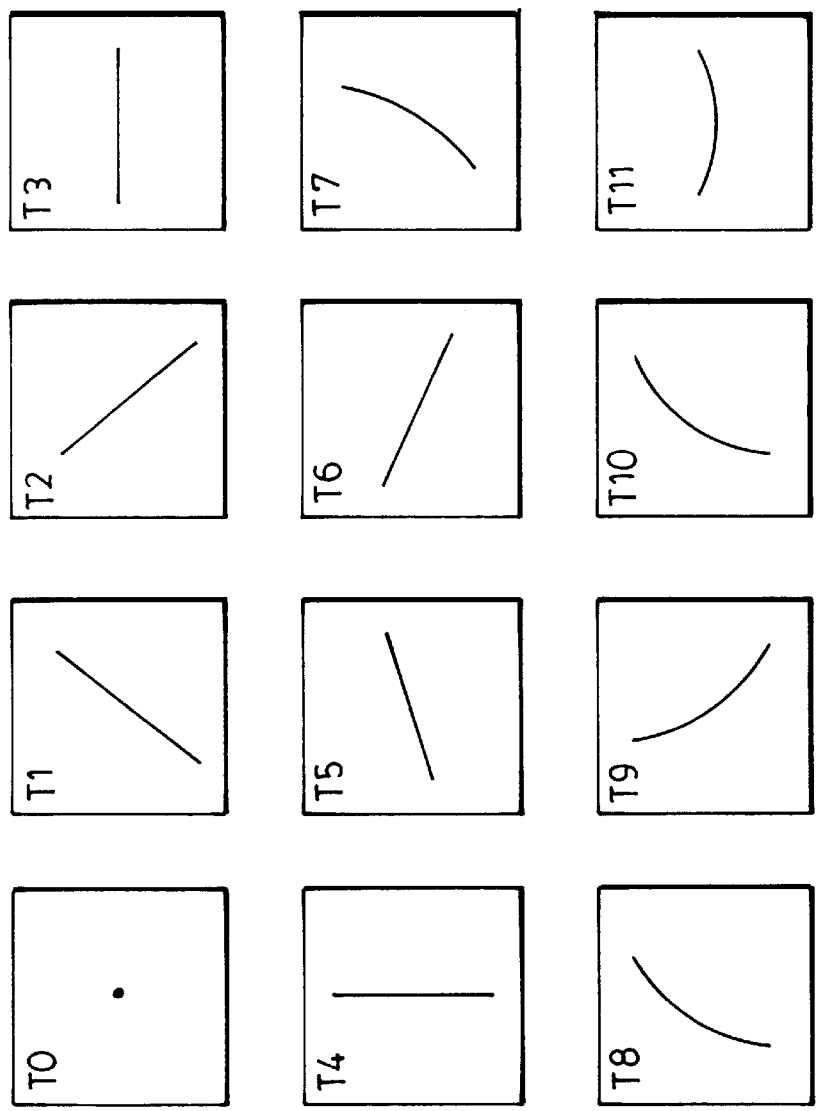
FIG. 22 is a diagram showing an example of a set of basic strokes prepared in advance for the reasoning mechanism.

FIG. 21 shows a hand-written character [大] to be entered and an example of the stroke chain and FIG. 22 shows part of the set of basic strokes prepared in advance in the reasoning mechanism.

It is assumed that a hand-written character [大] is entered as shown in FIG. 21(A). In this case, a stroke chain S1→S2→S3 shown in FIG. 21(B) is entered. The strokes which form this stroke chain can be those strokes which include the information of moving directions of the pen along with lapse of time as shown with broken line arrows. In this case, a set of basic strokes including the information of moving directions of the pen is prepared and the stroke chain including the information of moving directions of the pen is entered. For simplification, however, the information of moving directions of the pen, for example, the information that the pen is moved from left to right or from right to left to draw a horizontal stroke is ignored and a resultant stroke, that is, the fact that a horizontal stroke is drawn as a result is defined as a stroke.

A stroke chain as shown in FIG. 21(B) is entered into the reasoning mechanism and the basic strokes corresponding to strokes S1, S2 and S3 which form this stroke chain are obtained. Such obtention is not limited in particular and can depend on, for example, a simple pattern matching method or a neocognitron suited for image recognition which is a type of neural network or a fuzzy reasoning described in the aforementioned literature.

A basic stroke chain T3→T7→T9 corresponding to the entered stroke chain S1→S2→S3 is obtained by one of methods as described above. The basic stroke chain T3→T7→T9 thus obtained is entered, as texts for basic strokes, in sequence into the semiconductor memory as shown, for example, in FIG. 2~FIG. 5 and the character codes Code numbers) corresponding to the basic stroke chain (text chain) entered from this semiconductor memory are outputted.

Figure 23:
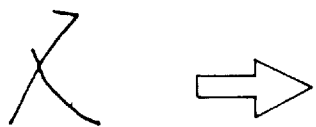
FIG. 23 is a diagram showing an example of a hand-written character and the probability of basic strokes which form this hand-written character.
Figure 23:
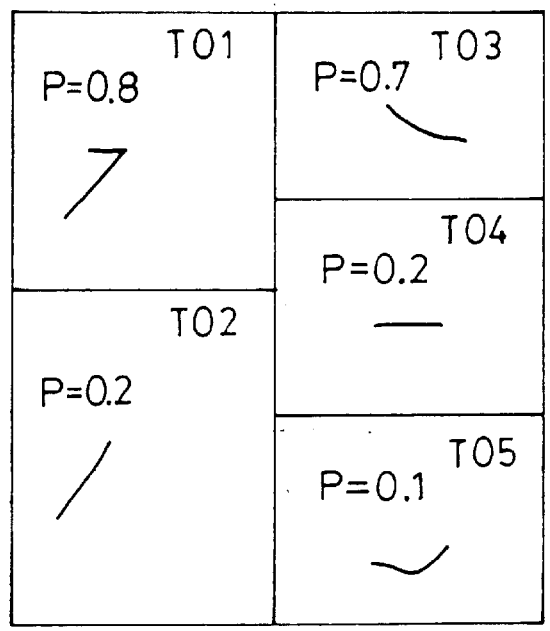

FIG. 23 shows a hand-written character and a probability of basic strokes which form the hand-written character.

When a hand-written character as shown in the left of FIG. 23 is entered, this entered hand-written character is converted to a basic stroke chain by the specified reasoning mechanism. Two basic strokes T01 and T02 shown in the drawing are expected as probable basic strokes corresponding to the first hand-written stroke and the probability that these basic strokes are correct is assumed as P=0.8 and P=0.2, respectively. Three basic strokes T03, T04 and T05 shown in the drawing are expected as probable basic strokes corresponding to the following hand-written stroke and the probability that these basic strokes are correct is assumed as P=0.7, P=0.2 and P=0.1. If the probability obtained by the specified calculation based on the reasoning mechanism is as described above, the probabilities (relative values) of basic stroke chains are as shown below:

| Basic stroke chain | Probability |
|---|---|
| [T01 → T03] | P = 0.8 + 0.7 = 1.5 |
| [T01 → T04] | P = 0.8 + 0.2 = 1.0 |
| [T01 → T05] | P = 0.8 + 0.1 = 0.9 |
| [T02 → T03] | P = 0.2 + 0.7 = 0.9 |
| [T02 → T04] | P = 0.2 + 0.2 = 0.4 |
| [T02 → T05] | P = 0.2 + 0.1 = 0.3 |

Accordingly, the most probable basic stroke chain is [T01→T03] (probability P=1.5) and the succeeding most probable stroke chain is [T01→T04] (probability P=1.0).

The character codes corresponding to the basic stroke chains are obtained in sequence from the most probable basic stroke chain stored in the semiconductor memory of the present invention by calculations from the probability of the basic stroke chain and that of individual basic strokes and therefore an identified character can be displayed in a probable sequence or probable characters more than specified can be simultaneously displayed to be selected by an operator.

What is claimed is:

1. A method for coding a plurality of text arranged at nodes on a tree structure comprising:

arranging the plurality of text in a text chain in sequence along a branch of the tree structure;

tracing branches of the tree structure to determine a code number assigned to a node;

assigning a first group of information and a second group of information to nodes, wherein the first group of information includes a text of an associated node and a node number of a node which is one stage above the associated node, the second group of information includes a node number of the associated node and a code number assigned to the associated node;

retrieving text from a text chain, and a node number included a second group of information associated with a previously detected node;

determining whether the retrieved text and the retrieved node number match a first group of information associated with other nodes;

detecting the other nodes which are associated with a first group of information which match the retrieved text and the retrieved node number; and repeating the retrieving, determining and detecting steps as necessary to convert a desired text chain into a code number, wherein there exists a node which is not assigned a code number.

2. An apparatus for coding a plurality of text arranged at nodes on a tree structure, comprising:

means for arranging the plurality of text in a text chain in sequence along a branch of the tree structure;

means for tracing branches of the tree structure to determine a code number assigned to a node;

means for assigning a first group of information and a second group of information to nodes, wherein the first group of information includes a text of an associated node and a node number of a node which is one stage above the associated node, the second group of information includes a node number of the associated node and a code number assigned to the associated node;

means for retrieving text from a text chain, and a node number included in a second group of information associated with a previously detected node;

means for determining whether the retrieved text and the retrieved node number match a first group of information associated with other nodes;

means for detecting the other nodes which are associated with a first group of information which match the retrieved text and the retrieved node number; and means for controlling the retrieving, determining and detecting means to convert a desired text chain into a code number wherein there exists a node which is not assigned a code number.

* * * * *